United States Patent [19]

Nagai et al.

[11] Patent Number: 5,760,570
[45] Date of Patent: Jun. 2, 1998

[54] RECHARGEABLE BATTERY APPARATUS

[75] Inventors: Tamiji Nagai; Kazunori Ozawa, both of Kanagawa, Japan

[73] Assignee: Sony Corporation, Tokyo, Japan

[21] Appl. No.: 742,318

[22] Filed: Nov. 1, 1996

[30] Foreign Application Priority Data

Nov. 10, 1995 [JP] Japan ................................ 7-317287

[51] Int. Cl.⁶ ............................ H01M 10/44; H02J 7/04
[52] U.S. Cl. .................. 320/162; 370/128; 370/DIG. 31; 370/157
[58] Field of Search ........................... 320/5, 6, 13, 25, 320/32, 39, 57, 59, 128, 125, 165, 162, 157, DIG. 31

[56] References Cited

U.S. PATENT DOCUMENTS

| | | | |
|---|---|---|---|
| 5,073,837 | 12/1991 | Baek | 320/13 X |
| 5,557,188 | 9/1996 | Piercey | 320/5 |
| 5,583,384 | 12/1996 | Henry | 320/59 X |
| 5,629,600 | 5/1997 | Hara | 320/5 |
| 5,635,819 | 6/1997 | Ryberg | 320/30 |

Primary Examiner—Peter S. Wong
Assistant Examiner—Gregory J. Toatley, Jr.
Attorney, Agent, or Firm—Jay J. Maioli

[57] ABSTRACT

The invention provides a rechargeable battery apparatus wherein, when secondary batteries having different terminal voltages are used in parallel connection, a back current is prevented and a loss which is produced in a diode for prevention of back current is reduced. A plurality of switch elements are individually connected in series to a plurality of secondary batteries, and diodes for prevention of back current for the secondary batteries are individually connected in parallel to the switch elements. Upon parallel charging or parallel discharging of the secondary batteries, voltages across the diodes are detected by a reverse bias detection circuit, and the switch element which corresponds to one of the diodes which exhibits a reverse bias voltage is switched on.

20 Claims, 17 Drawing Sheets $E1a \neq E1b \ (E1a > E1b)$ $E3c = E1b - E1a$
$\quad < 0$ $E3d = E1a - E1b$ F I G. 8
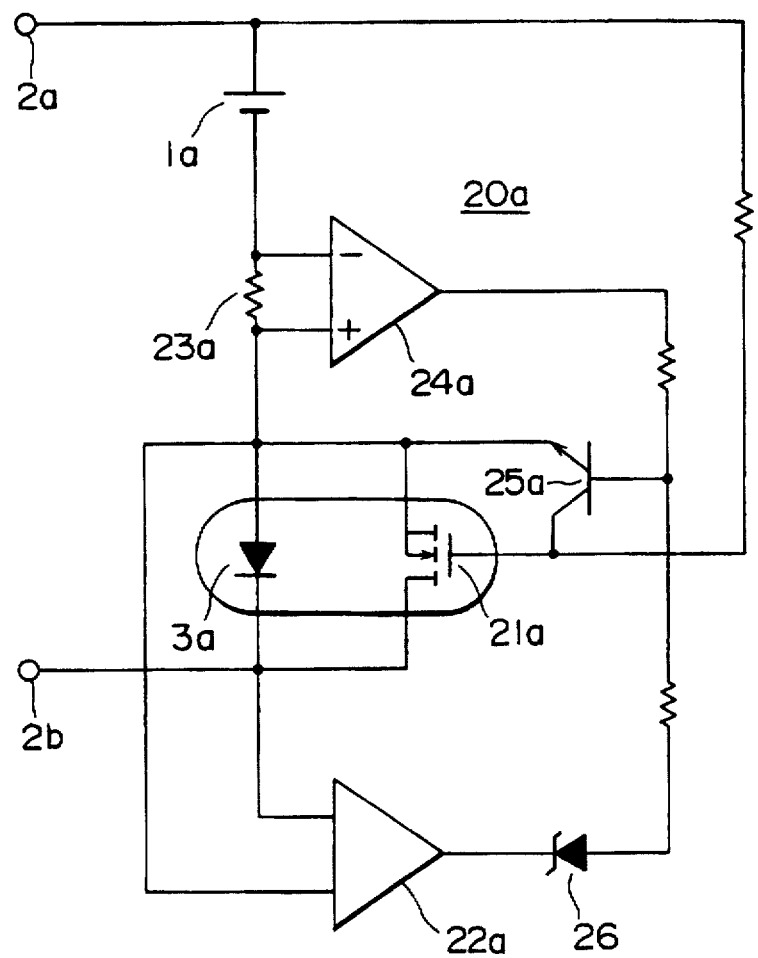

RECHARGEABLE BATTERY APPARATUS

BACKGROUND OF THE INVENTION

1. Field of the Invention

This invention relates to a rechargeable battery apparatus wherein rechargeable or secondary batteries are connected in parallel to effect charging or discharging.

2. Description of the Related Art

A nickel-cadmium storage battery is popularly used as a power supply for a battery-driven electronic apparatus such as a portable small size electronic apparatus. In recent years, a nickel-hydrogen storage battery of a higher capacity and a lithium ion storage battery of a higher energy density and a higher energy density than the energy density of the nickel-hydrogen battery have become available.

The lithium ion storage battery has a nominal voltage of 3.6 V which is as high as three times the nominal voltage of 1.2 V of the nickel-cadmium storage battery or the nickel-hydrogen storage battery. Also the cycle life of charge and discharge of the lithium ion storage battery is 1,200 times which is higher than twice that of the nickel-cadmium storage battery or the nickel-hydrogen storage battery whose cycle life is 500 times.

Further, the nickel-cadmium storage battery or the nickel-hydrogen storage battery suffers from a phenomenon called memory effect wherein, if the battery is repeatedly used after it is charged and before it discharges 100%, then an inactive portion is produced in an electrode and drops the voltage midway of discharge, and the effective capacity is decreased by the memory effect.

However, this memory effect can be canceled to restore the normal capacity of the nickel-cadmium storage battery or the nickel-hydrogen storage battery by recharging it after it discharges fully. Accordingly, a charger for a nickel-cadmium storage battery or a nickel-hydrogen storage battery causes a battery to discharge fully before it charges the battery. Consequently, the time required for charge is increased and is dispersed.

Since the lithium ion storage battery does not suffer from such a memory effect as described above, a charger therefor can be simplified.

By the way, when secondary batteries mentioned above are charged in a parallel connection, if they have different terminal voltages (electromotive forces), not only a charge current of a rated value from a charging power supply but also a current from one of the two secondary batteries which has a higher voltage flow into the other secondary battery which has a lower voltage.

Since the secondary batteries have low internal resistance values, the current flowing in from one of the secondary batteries has a higher value than the charge current of the rated value and may possibly have a bad influence on both of the secondary batteries.

Further, where the two secondary batteries mentioned above are connected in parallel and used so as to discharge to a load, that is, where a secondary battery apparatus of parallel connection is used as a power supply to a battery-driven electronic apparatus, when the batteries have different terminal voltages, not only the external load circuit but also one of the secondary batteries which has a lower voltage serve as loads to the other secondary battery which has a higher voltage. Consequently, in addition to a predetermined current supplied to the external load circuit, an unnecessary current flows to the secondary battery which has a lower voltage.

Since the secondary batteries have low internal resistance values, the current flowing to one of them exhibits a value higher than the predetermined load current and may possibly have a bad influence on both of the secondary batteries.

In order to eliminate such problems as described above, in a related art charging apparatus, when it is used to charge a plurality of secondary batteries connected in parallel, for example, as shown in FIG. 21A, the positive electrodes of two secondary batteries $1a$ and $1b$ are connected directly to a terminal $2a$ of a charging power supply $2$ while the negative electrodes of the secondary batteries $1a$ and $1b$ are connected to the other terminal $2b$ of the charging power supply $2$ via the anodes and the cathodes of diodes $3a$ and $3b$, respectively for prevention of back current.

Meanwhile, in a related art battery-driven electronic apparatus, where a plurality of secondary batteries are connected in parallel and used as a power supply therefor, for example, as shown in FIG. 21B, the positive electrodes of two secondary batteries $1a$ and $1b$ are connected directly to a terminal $4a$ of a load circuit $4$ while the negative electrodes of the secondary batteries $1a$ and $1b$ are connected to the other terminal $4b$ of the load circuit $4$ via the cathodes and the anodes of diodes $3c$ and $3d$, respectively for prevention of back current.

However, in such related art parallel charging apparatus and parallel discharging apparatus as shown in FIGS. 21A and 21B, a forward voltage drop of, for example, approximately 0.6 V is produced by forward currents in the diodes $3a$, $3d$ for prevention of back current as is well known in the art. Thus, the related art parallel charging apparatus and parallel discharging apparatus have a problem in that a loss corresponding to the product of the forward voltage drop and a charge current or a discharge current is produced in each of the diodes $3a$, $3d$ for prevention of back current.

SUMMARY OF THE INVENTION

It is an object of the present invention to provide a rechargeable battery apparatus wherein, when secondary batteries having different terminal voltages are connected in parallel, a back current is prevented and a loss which is produced in a diode for prevention of back current is reduced.

In order to attain the object described above, according to an aspect of the present invention, there is provided a rechargeable battery apparatus, comprising rechargeable battery means for storing and utilizing electric charge, diode means connected in series to the rechargeable battery means for preventing back current, switching means connected in parallel to the diode means for canceling loss of the diode means, and control means for detecting a voltage between the opposite terminals of the diode means and controlling operation of the switching means in accordance with the detected voltage.

According to another aspect of the present invention, there is provided a rechargeable battery apparatus, comprising rechargeable battery means for storing and utilizing electric charge, first and second diode means connected in series to the rechargeable battery means and in the opposite directions to each other for preventing back current, first and second switching means connected in parallel to the first and second diode means, respectively for canceling loss of the first and second diode means, and control means for detecting voltages between the opposite terminals of the first and second diode means and controlling operation of the first and second switching means in accordance with the detected voltages.

According to a further aspect of the present invention. there is provided a rechargeable battery apparatus, comprising rechargeable battery means for storing and utilizing electric charge, switching means connected in series to the rechargeable battery means for controlling a path of current, switch detecting means for detecting a voltage at a terminal of the switching means, a current detection resistor connected in series to the rechargeable battery means for detecting current to the rechargeable battery means, a voltage detection resistor for detecting a voltage between the opposite terminals of the cur rent detection resistor, and control means for controlling operation of the switching means in accordance with outputs of the switch detecting means and the voltage detection resistor.

With the rechargeable battery apparatus, when the rechargeable battery means which includes secondary batteries having different terminal voltages is used in parallel connection, a back current to any secondary batteries is prevented and a loss which is produced in the diode means for prevention of back current is reduced.

The above and other objects, features and advantages of the present invention will become apparent from the following description and the appended claims, taken in conjunction with the accompanying drawings.

BRIEF DESCRIPTION OF THE DRAWINGS

FIG. 8 is a circuit diagram showing a detailed construction of part of the rechargeable battery apparatus shown in FIG. 7;

DESCRIPTION OF PREFERRED EMBODIMENTS

First Embodiment

Figure 1:
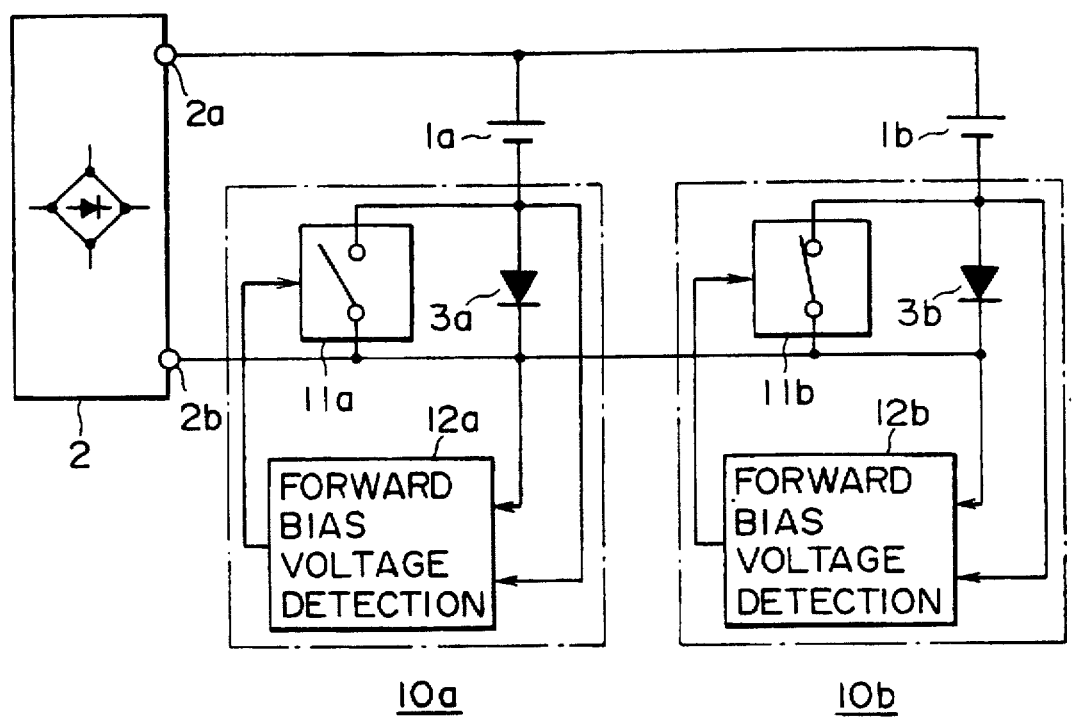
FIG. 1 is a block diagram showing a construction in principle of a rechargeable battery apparatus according to a first preferred embodiment of the present invention.
Figure 2:
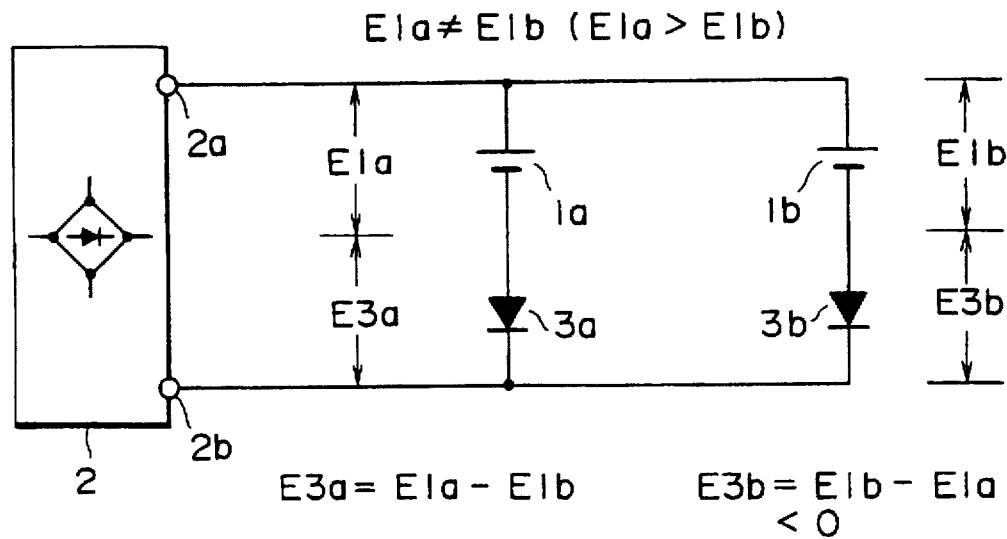
FIG. 2 is a wiring diagram illustrating operation of the rechargeable battery apparatus shown in FIG. 1.

Referring first to FIGS. 1 and 2, there is shown a rechargeable battery apparatus according to a first preferred embodiment of the present invention. The rechargeable battery apparatus shown in FIG. 1 is applied to a charging apparatus. It is to be noted that, in FIG. 1, like elements to those of the related art parallel charging apparatus of FIG. 21A described hereinabove are denoted by like reference symbols.

Referring first to FIG. 1, the positive electrodes of two secondary batteries 1a and 1b are connected directly to a terminal 2a of a charging power supply 2 while the negative electrodes of the secondary batteries 1a and 1b are connected to the other terminal 2b of the charging power supply 2 via the anodes and the cathodes of diodes 3a and 3b, respectively, for prevention of back current.

A charge control circuit 10a is formed from the diode 3a for prevention of back current, which is connected to the secondary battery 1a, an electronic switch 11a and a forward bias voltage detection circuit 12a. The forward bias voltage detection circuit 12a has a suitable hysteresis characteristic as hereinafter described.

The electronic switch 11a is connected in parallel to the diode 3a, and a voltage between the opposite terminals of the diode 3a is supplied to the forward bias voltage detection circuit 12a. A detection output of the forward bias voltage detection circuit 12a is supplied as a control signal to the electronic switch 11a.

Another charge control circuit 10b has a similar construction and operates similarly to the charge control circuit 10a.

Operation of the charging apparatus of FIG. 1 will be described below with additional reference to FIG. 2.

It is assumed that, in an initial state, the electronic switches 11a and 11b are both in an off state, and the secondary batteries 1a and 1b have terminal voltages E1a and E1b which have a relationship given by $E1a > E1b$ In the conditions describe d above, in such a discharging state as seen in FIG. 2, a reverse bias voltage $E3b$ (a forward bias voltage of $-E3b$) given by $$E3b=E1b<0$$

is applied to the diode 3b connected to the secondary battery 1b which has a lower terminal voltage than the terminal voltage of the secondary battery 1a.

In the rechargeable battery apparatus of the first embodiment of FIG. 1, a forward bias voltage of the diode 3b is detected by the forward bias voltage detection circuit 12b, and a detection output of the forward bias voltage detection circuit 12b is supplied to the electronic switch 11b so as to be switched on as seen in FIG. 1.

Consequently, the charging path of the secondary battery 1b which has a lower voltage than the voltage of the secondary battery 1a, has a lower equivalent resistance than the charging path of the secondary battery 1a which has a higher voltage than the voltage of the secondary battery 1b, and the charge current from the charging power supply 2 principally flows into the secondary battery 1b.

In this instance, the current from the secondary battery 1a having a higher voltage is hindered by the diode 3a and does not flow into the secondary battery 1b having a lower voltage.

As the charging of the secondary battery 1b which has a lower voltage proceeds, the terminal voltage E1b thereof rises. Then, if the terminal voltages E1a and E1b of the two secondary batteries 1a and 1b become substantially equal to each other, then the forward bias voltage E3a of the diode 3a becomes substantially equal to "0", and this is detected by the forward bias voltage detection circuit 12a, thereby causing the electronic switch 11a to be switched on opposite to that shown in FIG. 1. Thereafter, the equivalent resistances of the charging paths of the secondary batteries 1a and 1b become substantially equal to each other and the secondary batteries 1a and 1b are individually charged up by 100%.

As described above, in the charging apparatus of the first embodiment, as an electronic switch connected in parallel to a diode for prevention of back current is switched on upon charging, the loss which is produced in the diode for prevention of back current can be reduced.

Second Embodiment

Figure 3:
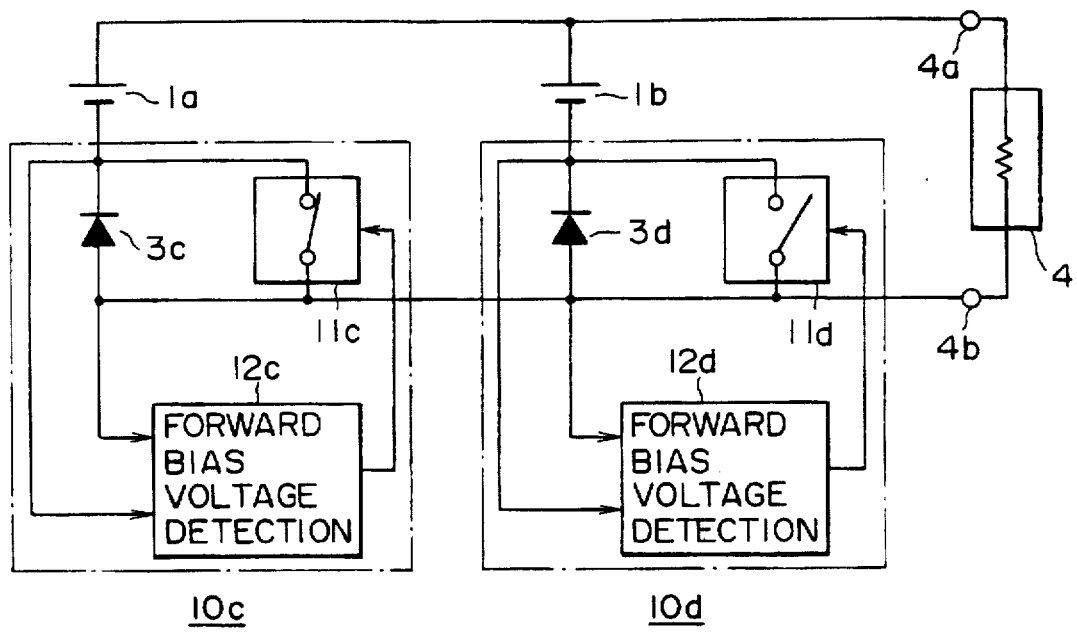
FIG. 3 is a block diagram showing a construction in principle of a rechargeable battery apparatus according to a second preferred embodiment of the present invention.
Figure 4:
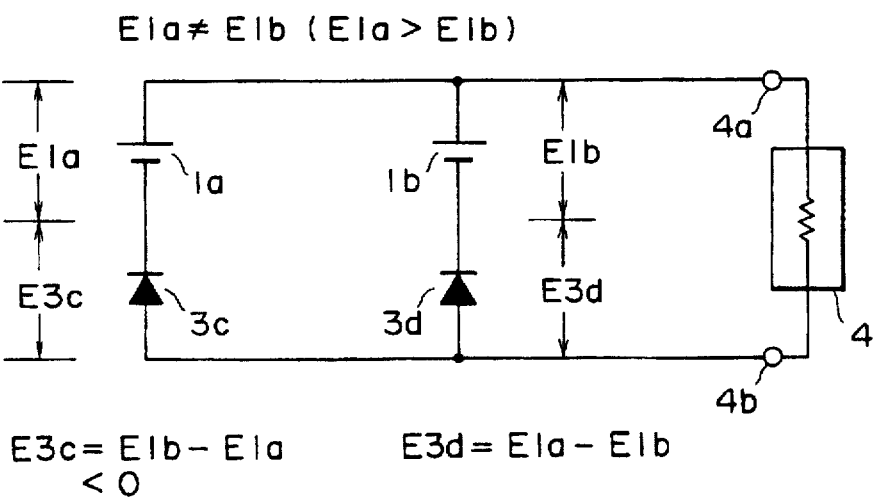
FIG. 4 is a wiring diagram illustrating operation of the rechargeable battery apparatus shown in FIG. 3.

Referring now to FIGS. 3 and 4, there is shown a rechargeable battery apparatus according to a second preferred embodiment of the present invention. The rechargeable battery apparatus shown is applied as a power supply apparatus for an electronic apparatus, that is, used so as to discharge the batteries. In FIG. 3, a connection configuration of the rechargeable battery apparatus is shown, and like elements to those of the related art parallel discharging apparatus of FIG. 21B described hereinabove are denoted by like reference symbols.

Referring first to FIG. 3, the positive electrodes of two secondary batteries 1a and 1b are connected directly to a terminal 4a of a load circuit 4 while the negative electrodes of the secondary batteries 1a and 1b are connected to the other terminal 4b of the load circuit 4 via the cathodes and the anodes of diodes 3c and 3d, respectively, for prevention of back current.

In the rechargeable battery apparatus shown in FIG. 3, discharge control circuits 10c and 10d of a same construction including the diodes 3c and 3d are provided corresponding to the secondary batteries 1a and 1b, respectively.

The discharge control circuit 10c is formed from the diode 3c connected to the secondary battery 1a, an electronic switch 11c and a forward bias voltage detection circuit 12c. The forward bias voltage detection circuit 12c has a suitable hysteresis characteristic as hereinafter described.

The electronic switch 11c is connected in parallel to the diode 3c, and a voltage between the opposite terminals of the diode 3c is supplied to the forward bias voltage detection circuit 12c. A detection output of the forward bias voltage detection circuit 12c is supplied as a control signal to the electronic switch 11c.

Also the other discharge control circuit 10d has a similar connection configuration and operates similarly to the discharge control circuit 10c.

Subsequently, operation of the discharging apparatus of the embodiment shown in FIG. 3 will be described with additional reference to FIG. 4.

It is assumed that, in an initial state, the electronic switches 11c and 11d are both in an off state and the secondary batteries 1a and 1b have terminal voltages E1a and E1b which have a relationship, for example, given by $$E1a>E1b$$

In the conditions described above, in such a discharging state as seen in FIG. 4, a reverse bias voltage E3c (a forward bias voltage of −E3c) given by $$E3c=E1b-E1a<0$$

is applied to the diode 3c connected to the secondary battery 1a which has a higher voltage than the voltage of the secondary battery 1b.

In the discharging apparatus of the embodiment shown in FIG. 3, a forward bias voltage of the diode 3c is detected by the forward bias voltage detection circuit 12c, and a detection output of the forward bias voltage detection circuit 12c is supplied to the electronic switch 11c so as to be switched on as seen in FIG. 3.

Consequently, the equivalent resistance of the discharging path of the secondary battery 1a which has a higher voltage than the voltage of the secondary battery 1b becomes lower than that of the discharging path of the secondary battery 1b which has a lower voltage than the voltage of the secondary battery 1a, and the discharge current to the load circuit 4 principally flows out from the secondary battery 1a.

In this instance, the current from the secondary battery 1a is hindered by the diode 3d and does not flow into the secondary battery 1b having a lower voltage.

As the discharging of the secondary battery 1a which has a higher voltage proceeds, the terminal voltage E1a thereof drops. Then, if the terminal voltages E1a and E1b of the two secondary batteries 1a and 1b become substantially equal to each other, then the reverse bias voltage E3d of the diode 3d becomes substantially equal to "0", and this is detected by the forward bias voltage detection circuit 12d, thereby causing the electronic switch 11d to be switched on opposite to that shown in FIG. 3. Thereafter, the equivalent resistances of the discharging paths of the secondary batteries 1a and 1b become substantially equal to each other and the secondary batteries 1a and 1b are individually discharged by 100%.

As described above, in the discharging apparatus of the second embodiment, as an electronic switch connected in parallel to a diode for prevention of back current is switched on upon discharging, the loss which is produced in the diode for prevention of back current can be reduced.

Examples of Detailed Circuit of Second Embodiment

Figure 5:
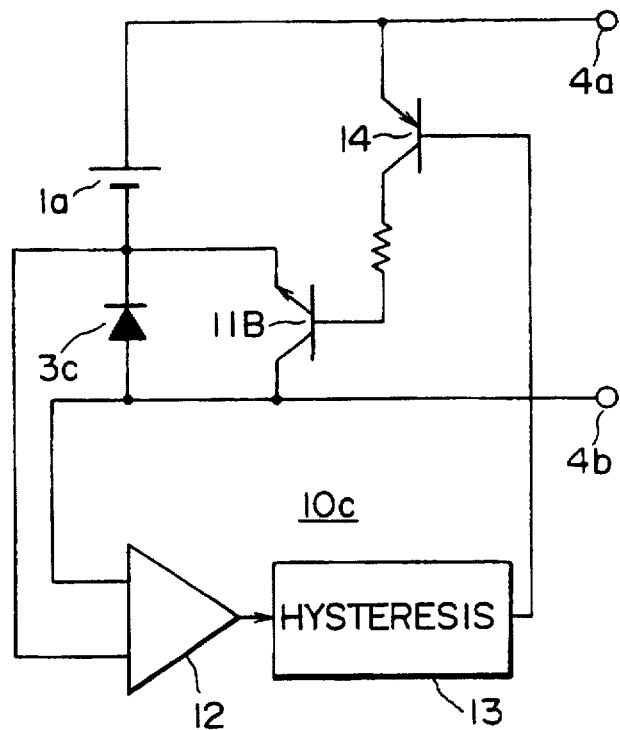
FIG. 5 is a circuit diagram showing a detailed construction of part of the rechargeable battery apparatus shown in FIG. 3.

The discharging apparatus of the second embodiment having such a construction as described above can be implemented particularly using, as shown in FIG. 5, an npn transistor 11B for the electronic switch. It is to be noted that, in FIG. 5 a construction of a discharge control circuit for the secondary battery 1a of the parallel connection is shown, but a construction of a discharge control circuit for the secondary battery 1b is omitted for simplified illustration.

Referring to FIG. 5, the collector and the emitter of the transistor 11B are connected to the anode and the cathode of the diode 3c, respectively, and the output of the forward bias voltage detection circuit 12 is supplied to the base of the transistor 11B via a hysteresis circuit 13 of a suitable characteristic and a pnp transistor 14 of a common emitter connection.

Figure 6:
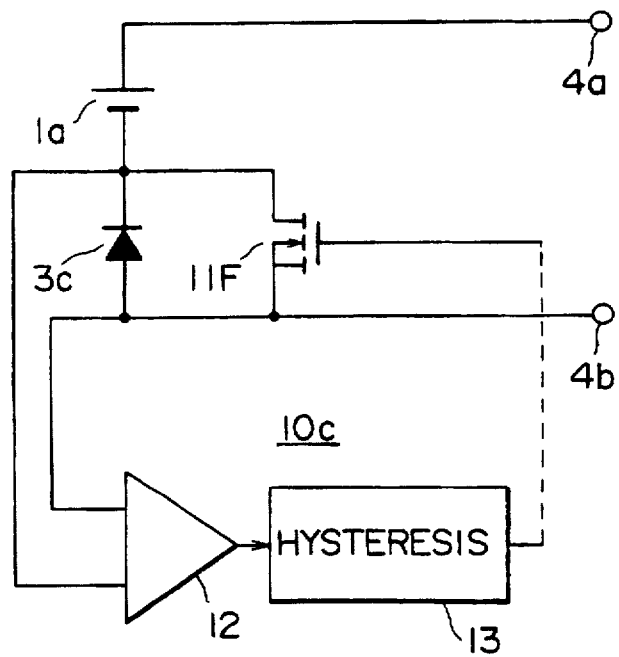
FIG. 6 is a circuit diagram showing another detailed construction of part of the rechargeable battery apparatus shown in FIG. 3.

The discharging apparatus of the second embodiment may alternatively be implemented as shown in FIG. 6 wherein an n-channel field effect transistor 11F is used for the electronic switch. Also in FIG. 6, for simplified illustration, a construction of a discharge control circuit for the secondary battery 1a of the parallel connection is shown, but a construction of a discharge control circuit for the other secondary battery 1b is omitted.

Referring to FIG. 6, the source and the drain of the field effect transistor 11F are connected to the anode and the cathode of the diode 3c, respectively, while the output of the forward bias voltage detection circuit 12 is supplied to the gate of the field effect transistor 11F via a hysteresis circuit 13 of a suitable characteristic.

It is to be noted that the hysteresis circuit 13 shown in FIGS. 5 and 6 acts to prevent a so-called oscillation state wherein, when the forward bias voltage detection circuit 12 operates and the transistor 11B or the field effect transistor 11F changes its state, the forward bias voltage detection circuit 12 immediately effects a reverse operation in response to the state change.

Third Embodiment

Figure 7:
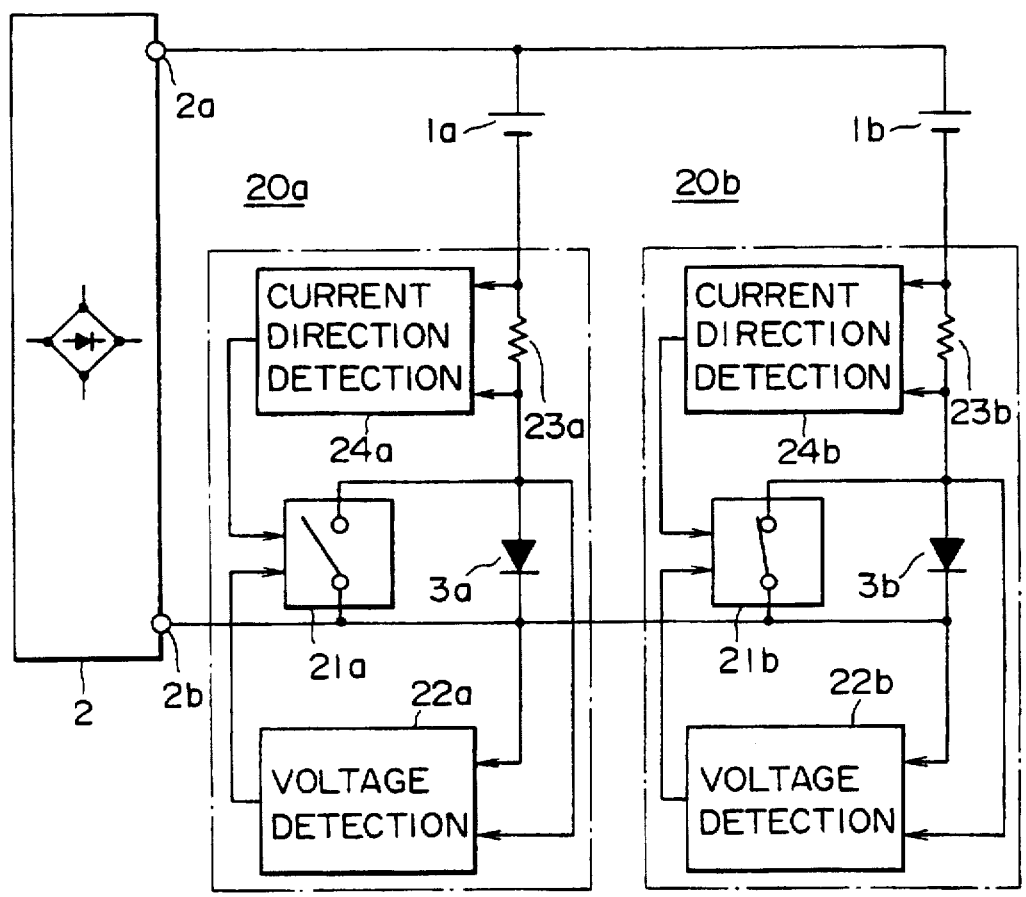
FIG. 7 is a block diagram showing a construction in principle of a rechargeable battery apparatus according to a third preferred embodiment of the present invention.

Referring now to FIGS. 7 and 8, there is shown a rechargeable battery apparatus according to a third preferred embodiment of the present invention. The rechargeable battery apparatus of the third embodiment is applied to a charging apparatus. A general construction of the rechargeable battery apparatus is shown in FIG. 7 while a detailed construction of part of the rechargeable battery apparatus is shown in FIG. 8. It is to be noted that, in FIGS. 7 and 8, like elements to those of the related art parallel charging apparatus of FIG. 21A described hereinabove are denoted by like reference symbols.

Referring first to FIG. 7, the positive electrodes of two secondary batteries 1a and 1b are connected directly to a terminal 2a of a charging power supply 2 while the negative electrodes of the secondary batteries 1a and 1b are connected to the other terminal 2b of the charging power supply 2 via current detecting resistors 23a and 23b of charge control circuits 20a and 20b and the anodes and the cathodes of diodes 3a and 3b for prevention of back current, respectively.

The charge control circuits 20a and 20b correspond to the secondary batteries 1a and 1b and have a same construction including the diodes 3a and 3b, respectively.

The charge control circuit 20a is formed from the diode 3a, an electronic switch 21a, a voltage detection circuit 22a, the resistor 23a and a current direction detection circuit 24a.

Also the charge control circuit 20b is similarly formed from the diode 3b, an electronic switch 21b, a voltage detection circuit 22b, the resistor 23b and a current direction detection circuit 24b.

The resistor 23a is interposed between the negative electrode of the secondary battery 1a and the anode of the diode 3a of the charge control circuit 20a, and a voltage between the opposite terminals of the resistor 23a is supplied to the current direction detection circuit 24a. Further, similarly as in the rechargeable battery apparatus of the first embodiment of FIG. 1 described above, the electronic switch 21a is connected in parallel to the diode 3a, and a voltage between the opposite terminals of the diode 3a is supplied to the voltage detection circuit 22a. Detection outputs of the two detection circuits 22a and 24a are supplied as control signals to the electronic switch 21a.

The charge control circuit 20a of the rechargeable battery apparatus of the embodiment of FIG. 7 described above may be constructed particularly in such a manner as shown in FIG. 8 wherein, for example, an n-channel field effect transistor is used for the electronic switch 21a. Further, the transistor 21a and the diode 3a for prevention of back current can be accommodated in the same package.

The source and the drain of the field effect transistor 21a are connected to the anode and the cathode of the diode 3a, respectively, and the collector of an npn transistor 25a of a common emitter connection is connected to the gate of the transistor 21a.

The output of the voltage detection circuit 22a is supplied to the base of the transistor 25a via a Zener diode 26, and the output of the current direction detection circuit 24a is supplied to the base of the transistor 25a.

A charge controlling operation of the rechargeable battery apparatus of the third embodiment of FIG. 7 will be described.

Referring to FIG. 7, when a discharge current flows in an upward direction in FIG. 7 through the resistor 23a, the current direction detection circuit 24a switches the electronic switch 21a off as seen in FIG. 7.

When the secondary battery 1a and the charge control circuit 20a are used solely, no discharge current flows through the resistor 23a, and consequently, the electronic switch 21 is switched on opposite to the state illustrated in FIG. 7.

If the electronic switch 21a in an initial state is off as seen in FIG. 7, then a forward voltage drop of approximately 0.6 V is produced in the diode 3a as described hereinabove. This forward voltage drop is detected by the voltage detection circuit 22a, and the electronic switch 21a is switched on opposite to the state illustrated in FIG. 7 under the control of the detection output of the voltage detection circuit 22a.

Consequently, in the rechargeable battery apparatus of the third embodiment of FIG. 7, when charging by a single battery is performed, the electronic switch connected in parallel to the diode for prevention of back current is kept on for the overall period, and consequently, the loss which is produced in the diode for prevention of back current can be prevented.

Further, in the rechargeable battery apparatus of the embodiment of FIG. 7, when the secondary battery 1b is connected in parallel to the secondary battery 1a to effect charging of the secondary battery 1a, the electronic switch 21a of the charge control circuit 20a is switched on opposite to the state thereof illustrated in FIG. 7 in such a manner as described hereinabove.

It is assumed that, at the point of time of the parallel connection, the terminal voltages E1a and E1b of the secondary batteries 1a and 1b satisfy the following expression E1a>E1b as described hereinabove.

Further, even if the electronic switch 21b of the charge control circuit 20b is off opposite to the position shown in FIG. 7 at the point of time of the parallel connection, such a forward voltage drop of the diode 3b as described above is detected by the voltage detection circuit 22b, and the electronic switch 21b is switched to on as seen in FIG. 7 under the control of the detection output of the voltage detection circuit 22b.

Accordingly, by connecting the secondary battery 1b in parallel to the secondary battery 1a during charging of the secondary battery 1a, a discharge current from the secondary battery 1a will flow into the secondary battery 1b in addition to the discharge current from the charging power supply 2.

Consequently, the discharge current flows through the resistor 23a, and this is detected by the current direction detection circuit 24a. As a result, the electronic switch 21a is switched off as seen in FIG. 7, and the discharge current from the secondary battery 1a is interrupted immediately.

Consequently, the equivalent resistance of the charging path of the secondary battery 1b which has a lower voltage than the voltage of the secondary battery 1a becomes lower than that of the charging path of the secondary battery 1a which has a higher voltage than the voltage of the secondary battery 1b, and the charge current from the charging power supply 2 principally flows into the secondary battery 1b which has a lower voltage.

In this instance, the current from the secondary battery 1a having a higher voltage is hindered by the diode 3a and does not flow into the secondary battery 1b having a lower voltage.

As the charging of the secondary battery 1b which has a lower voltage proceeds, the terminal voltage E1b thereof rises. Then, if the terminal voltages E1a and E1b of the two secondary batteries 1a and 1b become substantially equal to each other, then the forward bias voltage E3a of the diode 3a becomes substantially equal to 0, and this is detected by the voltage detection circuit 22a, thereby causing the electronic switch 21a to be switched on opposite to the state illustrated in FIG. 1. Thereafter, the equivalent resistances of the charging paths of the secondary batteries 1a and 1b become substantially equal to each other and the secondary batteries 1a and 1b are individually charged up by 100%.

As described above, in the charging apparatus of the third embodiment, as an electronic switch connected in parallel to a diode for prevention of back current is switched on upon parallel charging, the loss which is produced in the diode for prevention of back current can be reduced.

Fourth Embodiment

Figure 9:
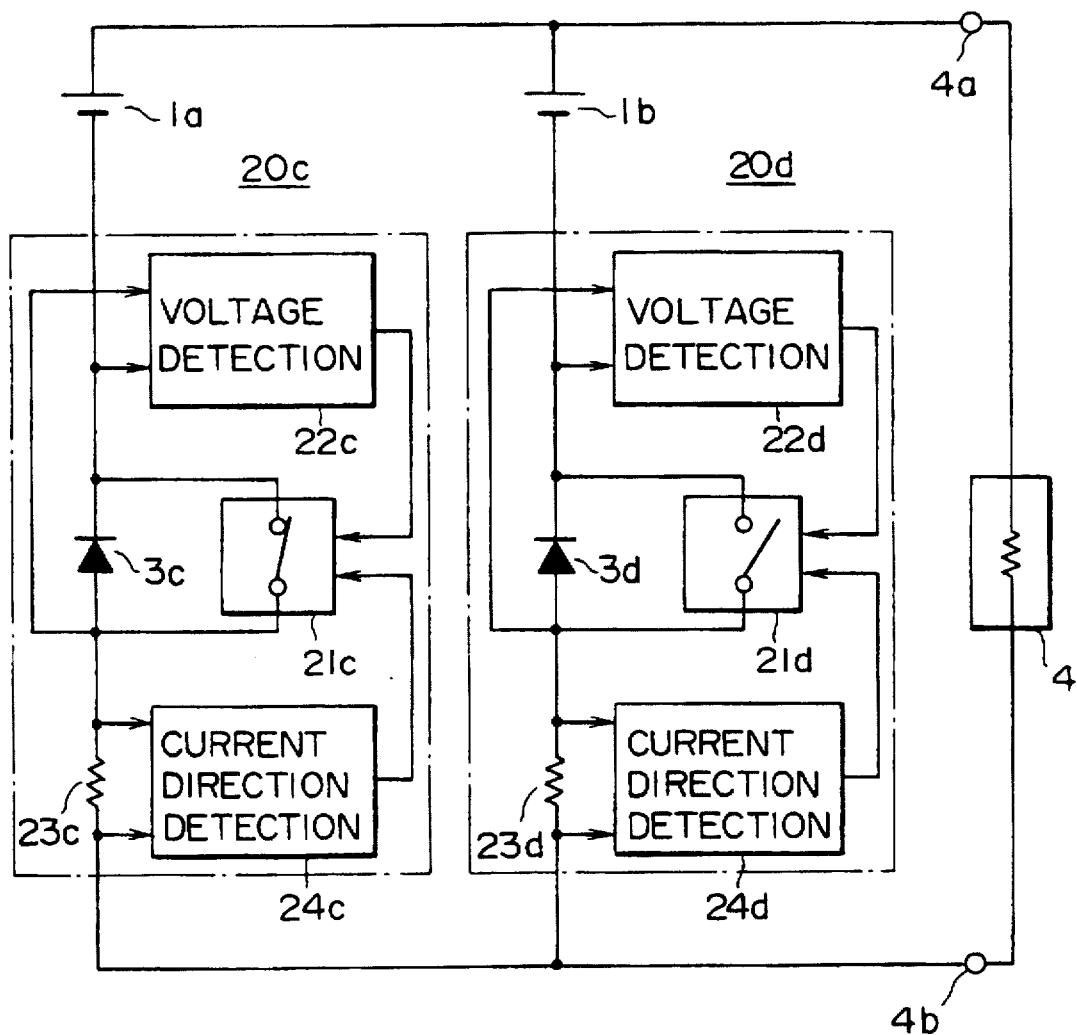
FIG. 9 is a block diagram showing a construction in principle of a rechargeable battery apparatus according to a fourth preferred embodiment of the present invention.
Figure 10:
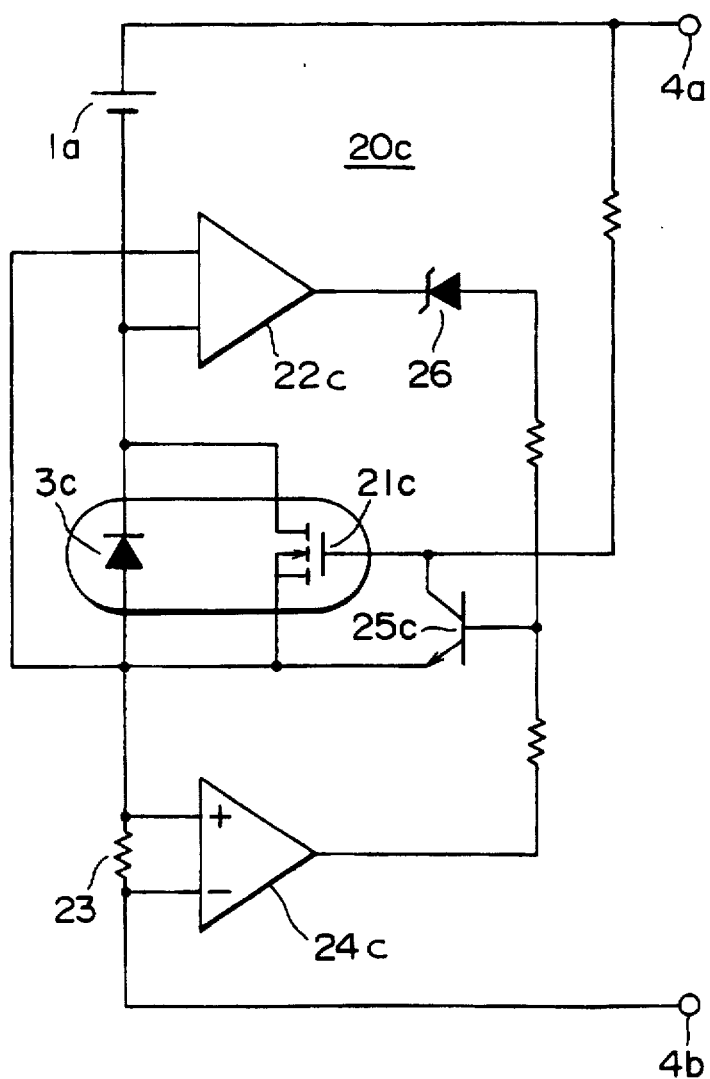
FIG. 10 is a circuit diagram showing a detailed construction of part of the rechargeable battery apparatus shown in FIG. 9.

Referring now to FIGS. 9 and 10, there is shown a rechargeable battery apparatus according to a fourth preferred embodiment of the present invention. The rechargeable battery apparatus of the fourth embodiment is used while a load 4 is connected thereto.

A general construction of the rechargeable battery apparatus of the fourth embodiment is shown in FIG. 9 while a detailed construction of part of the rechargeable battery apparatus is shown in FIG. 10. It is to be noted that, in FIGS. 9 and 10, like elements to those of the related art parallel discharging apparatus of FIG. 21B described hereinabove are denoted by like reference symbols.

Referring first to FIG. 9, the positive electrodes of two secondary batteries 1a and 1b are connected directly to a terminal 4a of a load circuit 4 while the negative electrodes of the secondary batteries 1a and 1b are connected to the other terminal 4b of the load circuit 4 via the cathodes and the anodes of diodes 3c and 3d for prevention of back current of discharge control circuits 20c and 20d and resistors 23c and 23d, respectively.

The discharge control circuits 20c and 20d of the rechargeable battery apparatus of the embodiment of FIG. 9 correspond to the secondary batteries 1a and 1b and have a same construction including the diodes 3c and 3d, respectively.

The discharge control circuit 20c is formed from the diode 3c, an electronic switch 21c, a voltage detection circuit 22c, a resistor 23c and a current direction detection circuit 24c.

Also the discharge control circuit 20d has a quite similar construction to that of the discharge control circuit 20c.

Similarly as in the rechargeable battery apparatus of the embodiment of FIG. 3 described hereinabove, the electronic switch 21c of the discharge control circuit 20c is connected in parallel to the diode 3c, and a voltage between the opposite terminals of the diode 3c is supplied to the voltage detection circuit 22c. The resistor 23c is interposed between the anode of the diode 3c of the discharge control circuit 20c and the terminal 4b of the load circuit 4, and a voltage between the opposite terminals of the resistor 23c is supplied to the current direction detection circuit 24c. Detection outputs of the two detection circuits 22c and 24c are supplied as control signals to the electronic switch 21c.

The discharge control circuit 20c of the rechargeable battery apparatus of the embodiment of FIG. 9 may be constructed particularly in such a manner as shown in FIG. 10 wherein, for example, an n-channel field effect transistor is used for the electronic switch 21c. Further, the transistor 21c and the diode 3c for prevention of back current can be accommodated in the same package.

The source and the drain of the field effect transistor 21c are connected to the anode and the cathode of the diode 3c, respectively, and the collector of an npn transistor 25c of a common emitter connection is connected to the gate of the transistor 21c.

The output of the voltage detection circuit 22c is supplied to the base of the transistor 25c via a Zener diode 26, and the output of the current direction detection circuit 24c is supplied to the base of the transistor 25c.

A charge control operation of the rechargeable battery apparatus of the fourth embodiment of FIG. 9 will be described below.

Referring to FIG. 9, when a discharge current flows in a downward direction in FIG. 9 through the resistor 23c, the current direction detection circuit 24c switches the electronic switch 21c off opposite to the state illustrated in FIG. 9.

For example, when the secondary battery 1a and the discharge control circuit 20c are used solely, no charge current flows through the resistor 23c, and consequently, the electronic switch 21c is switched on opposite to the state illustrated in FIG. 9.

If the electronic switch 21c in an initial state is off opposite to the state illustrated in FIG. 9, a forward voltage drop of approximately 0.6 V is produced in the diode 3c as described hereinabove. This forward voltage drop is detected by the voltage detection circuit 22c, and the electronic switch 21c is switched on as seen in FIG. 9 under the control of the detection output of the voltage detection circuit 22c.

Consequently, in the rechargeable battery apparatus of the embodiment of FIG. 9, when charging by a single battery is performed, the electronic switch connected in parallel to the diode for prevention of back current is kept on for the overall period, and consequently, the loss which is produced in the diode for prevention of back current can be prevented.

Further, in the rechargeable battery apparatus of the embodiment of FIG. 9, for example, when the secondary battery 1a is connected in parallel to the secondary battery 1b and used during discharging of the secondary battery 1b, the electronic switch 21d of the discharge control circuit 20d is switched on opposite to the state thereof illustrated in FIG. 9 in such a manner as described hereinabove.

It is assumed that, at the time of the parallel connection, the terminal voltages E1a and E1b of the secondary batteries 1a and 1b satisfy the following expression $$E1a > E1b$$

as described hereinabove.

Further, even if the electronic switch 21c of the discharge control circuit 20c is off opposite to the state illustrated in FIG. 9 at the time of the parallel connection, such a forward voltage drop of the diode 3c as described hereinabove is detected by the voltage detection circuit 22c, and the electronic switch 21c is switched on as seen in FIG. 9 under the control of the detection output of the voltage detection circuit 22c.

Accordingly, by connecting the secondary battery 1a in parallel to the secondary battery 1b during discharging of the secondary battery 1b, a discharge current from the secondary battery 1a which has a higher terminal voltage than the terminal voltage of the secondary battery 1b will flow into the secondary battery 1b.

Consequently, the charge current flows through the resistor 23d, and this is detected by the current direction detection circuit 24d of the discharge control circuit 20d. As a result, the electronic switch 21d is switched off as seen in FIG. 9, and the charge current from the secondary battery 1a is interrupted immediately by the diode 3d.

Consequently, the equivalent resistance of the discharging path of the secondary battery 1a which has a higher voltage than the voltage of the secondary battery 1b becomes lower than that of the discharging path of the secondary battery 1b which has a lower voltage than the voltage of the secondary battery 1a, and the discharge current to the load circuit 4 principally flows out from the secondary battery 1a which has a higher voltage.

As the discharging of the secondary battery 1a which has a higher voltage proceeds, the terminal voltage E1a thereof drops. Then, if the terminal voltages E1a and E1b of the two secondary batteries 1a and 1b become substantially equal to each other, then the reverse bias voltage E3d of the diode 3d becomes substantially equal to 0, and this is detected by the current direction detection circuit 24d of the discharge control circuit 20d, thereby causing the electronic switch 21d to be switched on opposite to the state illustrated in FIG. 9. Thereafter, the equivalent resistances of the discharging paths of the secondary batteries 1a and 1b become substantially equal to each other and the secondary batteries 1a and 1b are individually discharged by 100%.

As described above, in the rechargeable battery apparatus of the embodiment of FIG. 9, as an electronic switch connected in parallel to a diode for prevention of back current is switched on upon parallel discharging, the loss which is produced in the diode for prevention of back current can be reduced.

Fifth Embodiment

Figure 11:
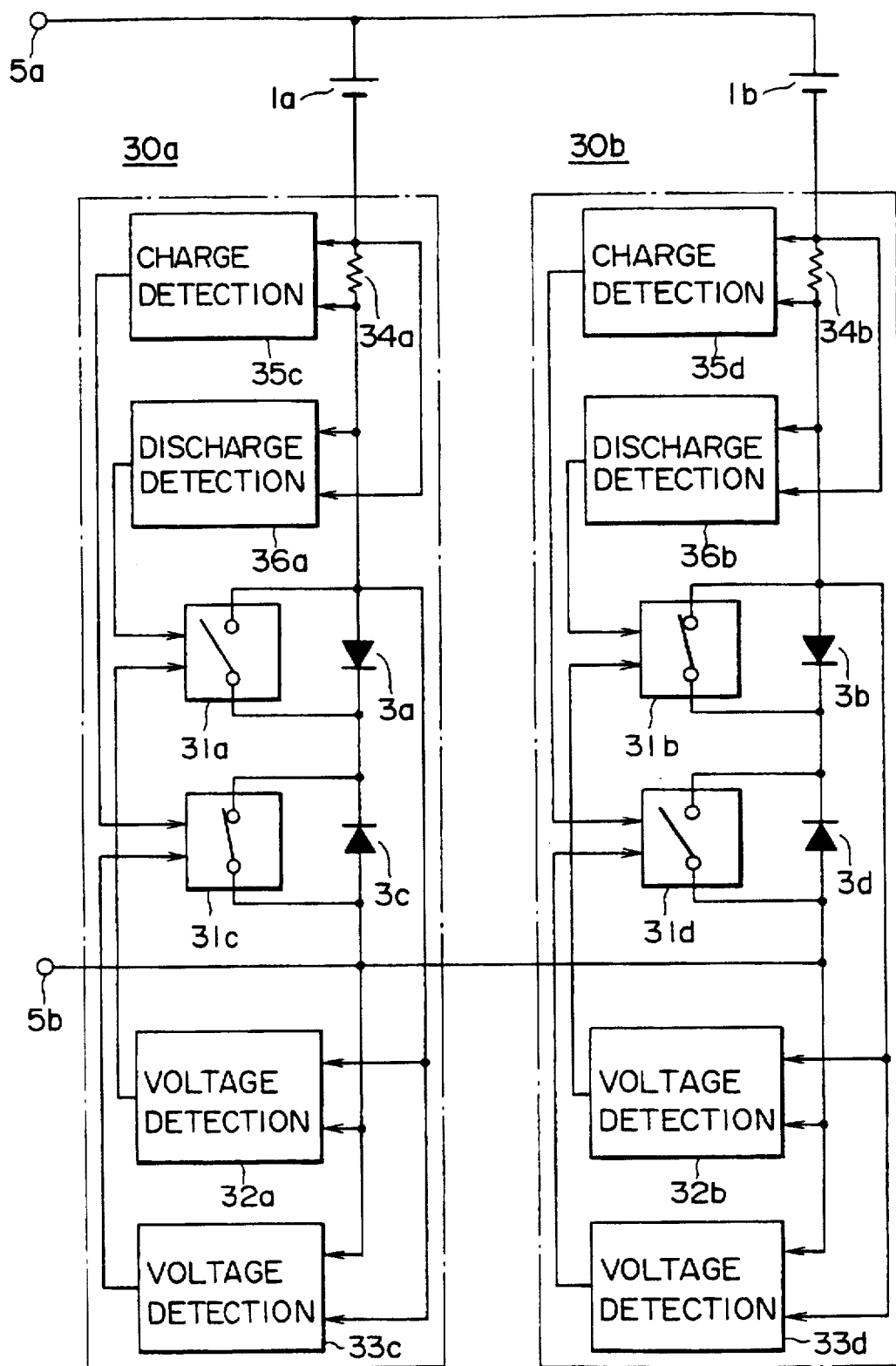
FIG. 11 is a block diagram showing a construction in principle of a rechargeable battery apparatus according to a fifth preferred embodiment of the present invention.
Figure 12:
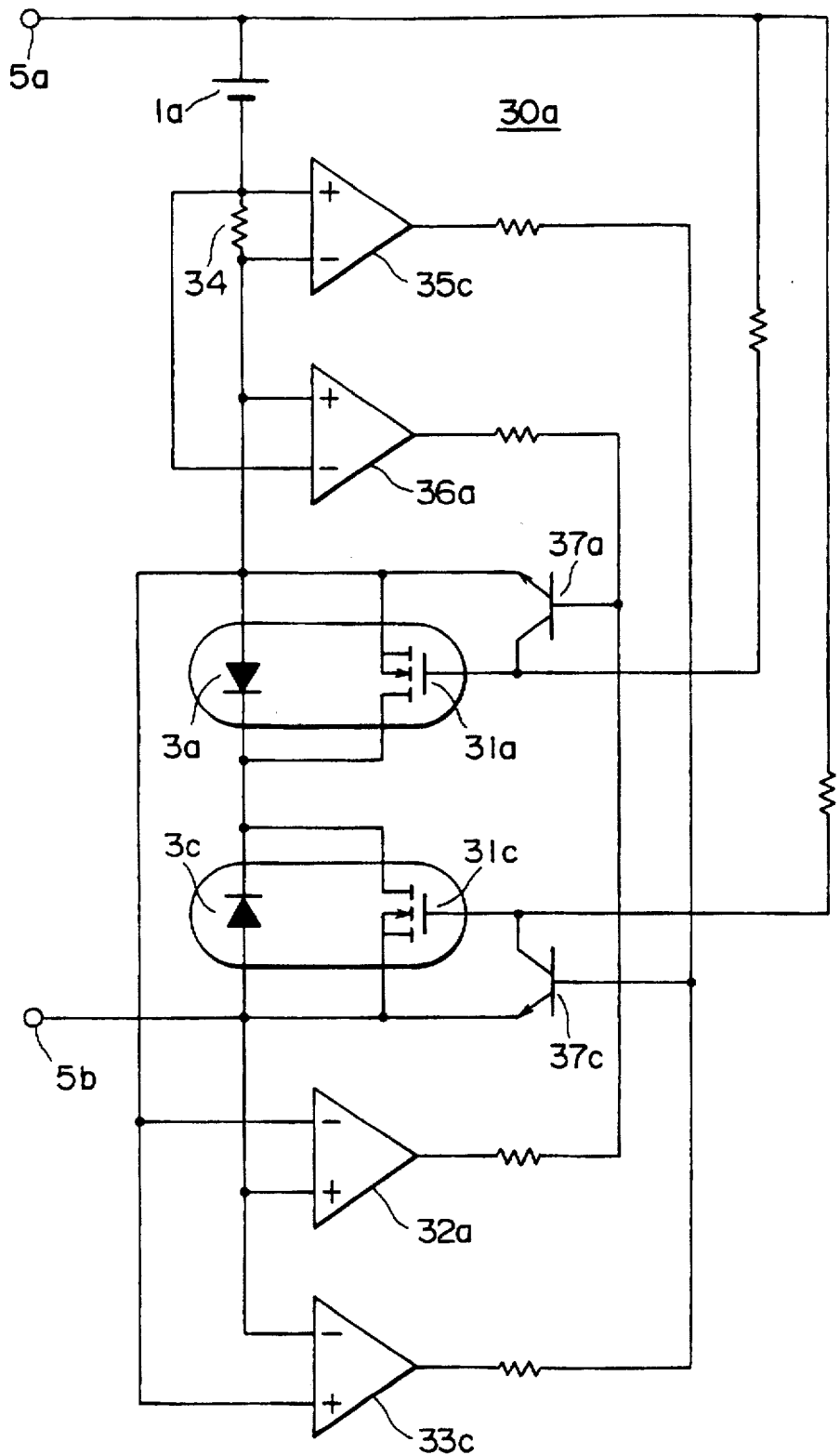
FIG. 12 is a circuit diagram showing a detailed construction of part of the rechargeable battery apparatus shown in FIG. 11.
Figure 21A:
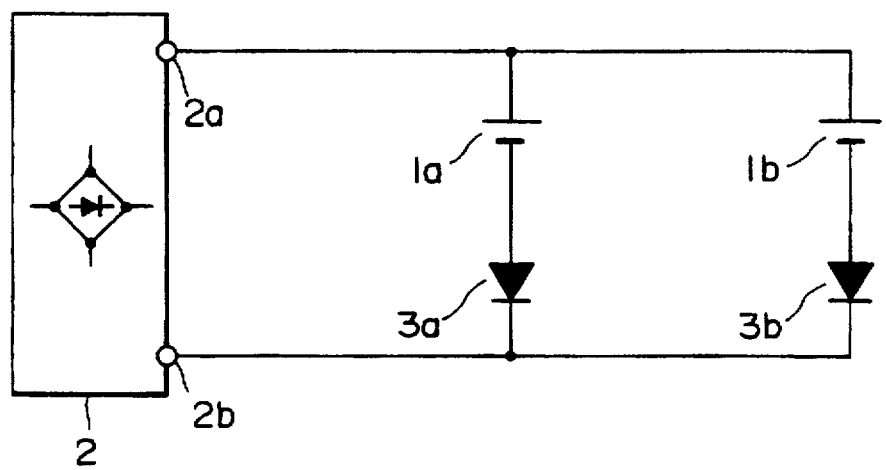
FIGS. 21A and 21B are block diagrams showing different exemplary charge and discharge control configurations of a related art rechargeable battery apparatus.
Figure 21B:
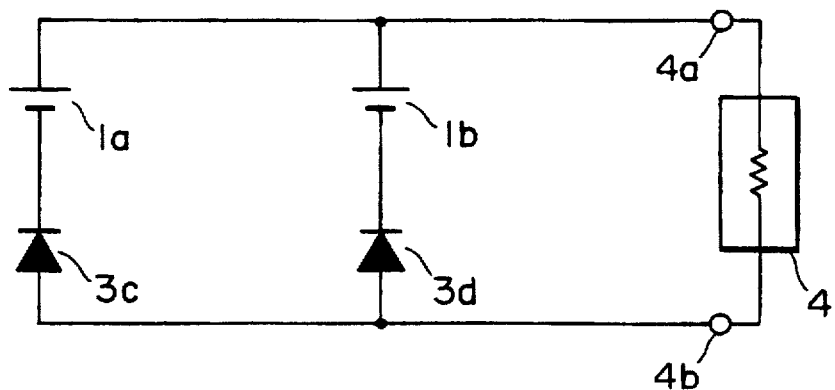

Referring now to FIGS. 11 and 12, there is shown a rechargeable battery apparatus according to a fifth preferred embodiment of the present invention. The rechargeable battery apparatus of the fifth embodiment is applied to an apparatus which effects both charging and discharging. A general construction of the rechargeable battery apparatus is shown in FIG. 11 while a detailed construction of part of the rechargeable battery apparatus is shown in FIG. 12. It is to be noted that, in FIGS. 11 and 12, like elements to those of the related art parallel charging and discharging apparatus of FIGS. 21A and 21B are denoted by like reference symbols.

Referring first to FIG. 11, the positive electrodes of two secondary batteries 1a and 1b are connected directly to a charging/discharging terminal 5a while current detecting resistors 34a and 34b and diodes 3a, 3c and 3b, 3d of charge/discharge control circuits 30a and 30b are interposed in series between the negative electrodes of the secondary batteries 1a and 1b and another charging/discharging terminal 5b, respectively. The diodes 3a, 3c and 3b, 3d are connected in pairs in the opposite directions to each other.

It is to be noted that the current detecting resistors 34a and 34b may otherwise be provided at locations where they are directly connected to the charging/discharging terminal 5b.

The charge/discharge control circuits 30a and 30b in the rechargeable battery apparatus of the embodiment of FIG. 11 correspond to the secondary batteries 1a and 1b and have a same construction including the pairs of diodes 3a, 3c and 3b, 3d, respectively.

The charge/discharge control circuit 30a is formed from the pair of diodes 3a and 3c, electronic switches 31a and 31c, voltage detection circuits 32a and 33c, a resistor 34a, a charge detection circuit 35c and a discharge detection circuit 36a.

Also the other charge/discharge control circuit 30b is formed from the diodes 3b and 3d, electronic switches 31b and 31d, voltage detection circuits 32b and 33d, a resistor 34b, a charge detection circuit 35d and a discharge detection circuit 36b quite similarly.

In the rechargeable battery apparatus of the embodiment of FIG. 11, the cathodes of the diodes 3a and 3c are connected to each other, and the electronic switches 31a and 31c are connected in parallel to the diodes 3a and 3c, respectively, similarly as in the rechargeable battery apparatus of the embodiments of FIGS. 1 and 3 described hereinabove. Further, a voltage between the anodes of the diodes 3a and 3c is supplied commonly to the voltage detection circuits 32a and 33c which are connected in the opposite polarities to each other.

The resistor 34a is interposed between the negative electrode of the secondary battery 1a and the anode of the diode 3a, and a voltage between the opposite terminals of the resistor 34a is supplied to commonly to the charge detection circuit 35c and the discharge detection circuit 36a.

Further, detection outputs of the voltage detection circuit 32a and the discharge detection circuit 36a are supplied as control signals to the electronic switch 31a, and detection outputs of the voltage detection circuit 33c and the charge detection circuit 35c are supplied as control signals to the other electronic switch 31c.

The charge/discharge control circuit 30a described above is particularly constructed in such a manner as shown in FIG. 12.

Referring to FIG. 12, for example, two n-channel field effect transistors are used for the electronic switches 31a and 31c. Further, pairs of the electronic switches 31a and 31c and the diodes 3a and 3c, respectively, for prevention of back current can be accommodated in the same packages.

The source and the drain of the field effect transistor 31a are connected to the anode and the cathode of the diode 3a, respectively, and the collector of an npn transistor 37a of a common emitter connection is connected to the gate of the electronic switch 31a. Detection outputs of the voltage detection circuit 32a and the discharge detection circuit 36a are supplied to the base of the transistor 37a.

Meanwhile, the source and the drain of the other field effect transistor 31c are connected to the anode and the cathode of the diode 3c, respectively, and the collector of an npn transistor 37c of a common emitter connection is connected to the gate of the transistor 31c. Detection outputs of the voltage detection circuit 33c and the charge detection circuit 35c are supplied to the base of the transistor 37c.

Operation of the rechargeable battery apparatus of the embodiment of FIG. 11 when the secondary battery 1b is connected in parallel to the secondary battery 1a during charging of the secondary battery 1a will be described below.

Referring to FIG. 11, it is assumed that, in an initial state, all of the electronic switches 31a, 31d are in an on state.

It is also assumed that, at the time of the parallel connection, the terminal voltages E1a and E1b of the secondary batteries 1a and 1b satisfy the relationship given by E1a>E1b In the conditions given above, a charge control operation of the rechargeable battery apparatus of the embodiment of FIG. 11 generally proceeds in the following manner.

a. The secondary battery 1a is charged solely.

b. A charge current is detected by means of the charge detection circuit 35c.

c. When the current is higher than a reference value, the electronic switch 31c is switched off.

The charge current is interrupted by the diode 3c.

d. If, however the current is equal to or lower than the reference value, the charging is continued.

e. The secondary battery 1b is connected in parallel to the secondary battery 1a.

f. It is detected by the discharge detection circuit 36a whether or not the secondary battery 1a is discharging.

g. When some discharge current is detected, the electronic switch 31a is switched off.

The discharging path of the secondary battery 1a is interrupted by the diode 3a.

h. A terminal voltage of the diode 3a is detected.

i. When the terminal voltage is higher than a predetermined value of, for example, 1.0 V, the off state of the electronic switch 31a is maintained.

j. When the terminal voltage is equal to or lower than the predetermined value, the electronic switch 31a is switched back to an on state, and charging is continued.

Even if some discharge from the secondary battery 1a is detected in step g above, the on state of the electronic switch 31b is maintained in the charge/discharge control circuit 30b of the secondary battery 1b which has a lower voltage than the voltage of the secondary battery 1a, and charging is continued.

On the other hand, in step h above, the terminal voltage of the diode 3a is detected by the voltage detection circuit 32a corresponding to the electronic switch 31a. In this instance, since the electronic switch 31c is in an on state, the terminal voltage of the diode 3c is substantially equal to 0.

Further, in the conditions described above, a parallel discharge control operation of the rechargeable battery apparatus of the embodiment of FIG. 11 generally proceeds in the following manner.

a. The secondary batteries 1a and 1b are connected in parallel to each other.

b. It is detected by the charge detection circuit 35d whether or not charging of the secondary battery 1b is proceeding.

c. When some charge current is detected, the electronic switch 31d is switched off.

The charging path of the secondary battery 1b is interrupted by the diode 3d.

d. A terminal voltage of the diode 3d is detected by the voltage detection circuit 33d.

e. When the terminal voltage is higher than a predetermined value of, for example, 1.0 V, the off state of the electronic switch 31d is maintained.

f. When the terminal voltage becomes equal to or lower than the predetermined value, the electronic switch 31d is switched back to an on state, and charging is continued.

As described above, in the rechargeable battery apparatus of the embodiment of FIG. 11, as an electronic switch connected in parallel to a diode for prevention of back current of at least one of two secondary batteries is switched on during a parallel charging period or a parallel discharging period of the secondary batteries, the loss which is produced in the diode for prevention of back current can be reduced.

Sixth Embodiment

Figure 13:
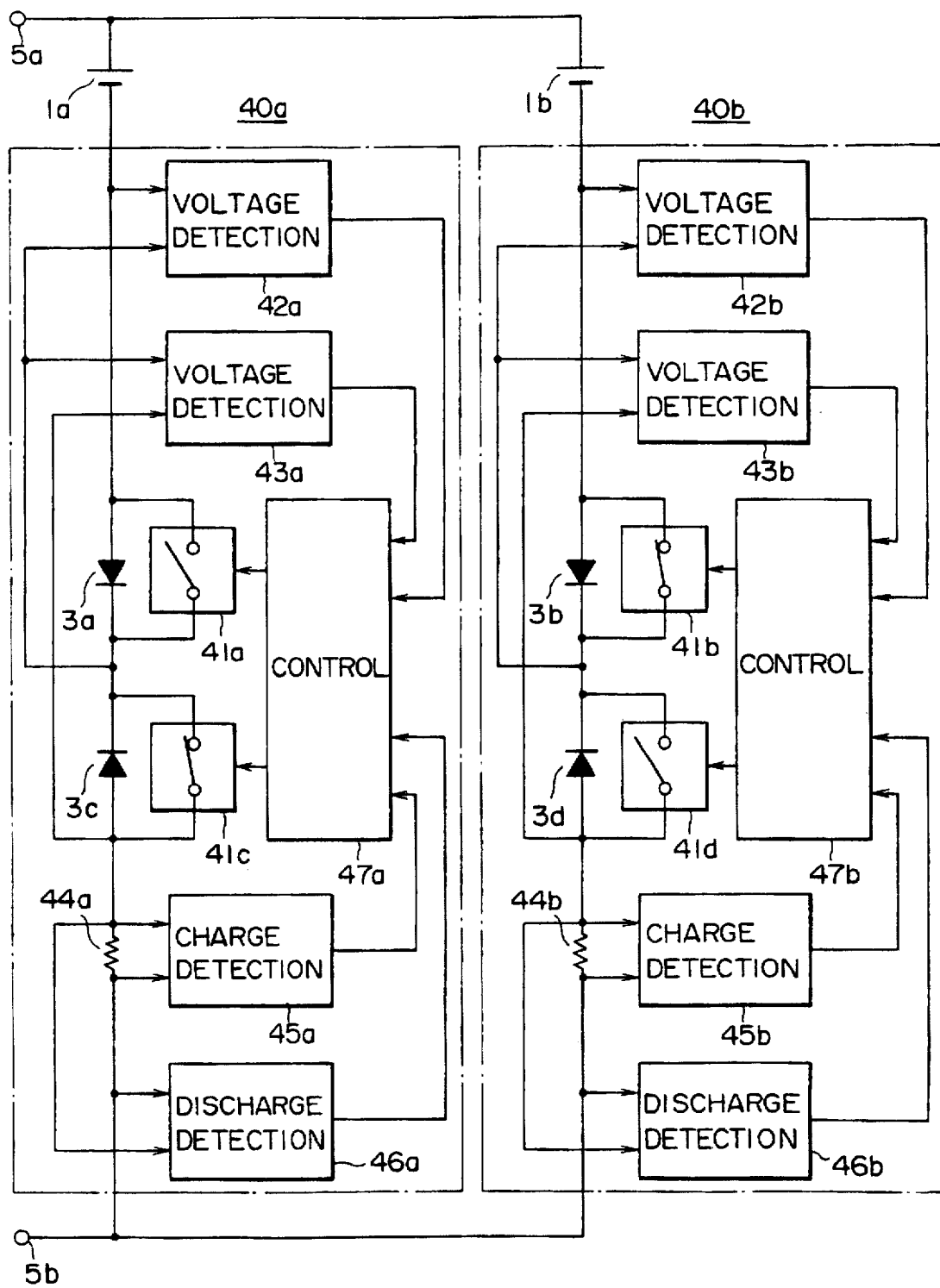
FIG. 13 is a block diagram showing a construction in principle of a rechargeable battery apparatus according to a sixth preferred embodiment of the present invention.
Figure 14:
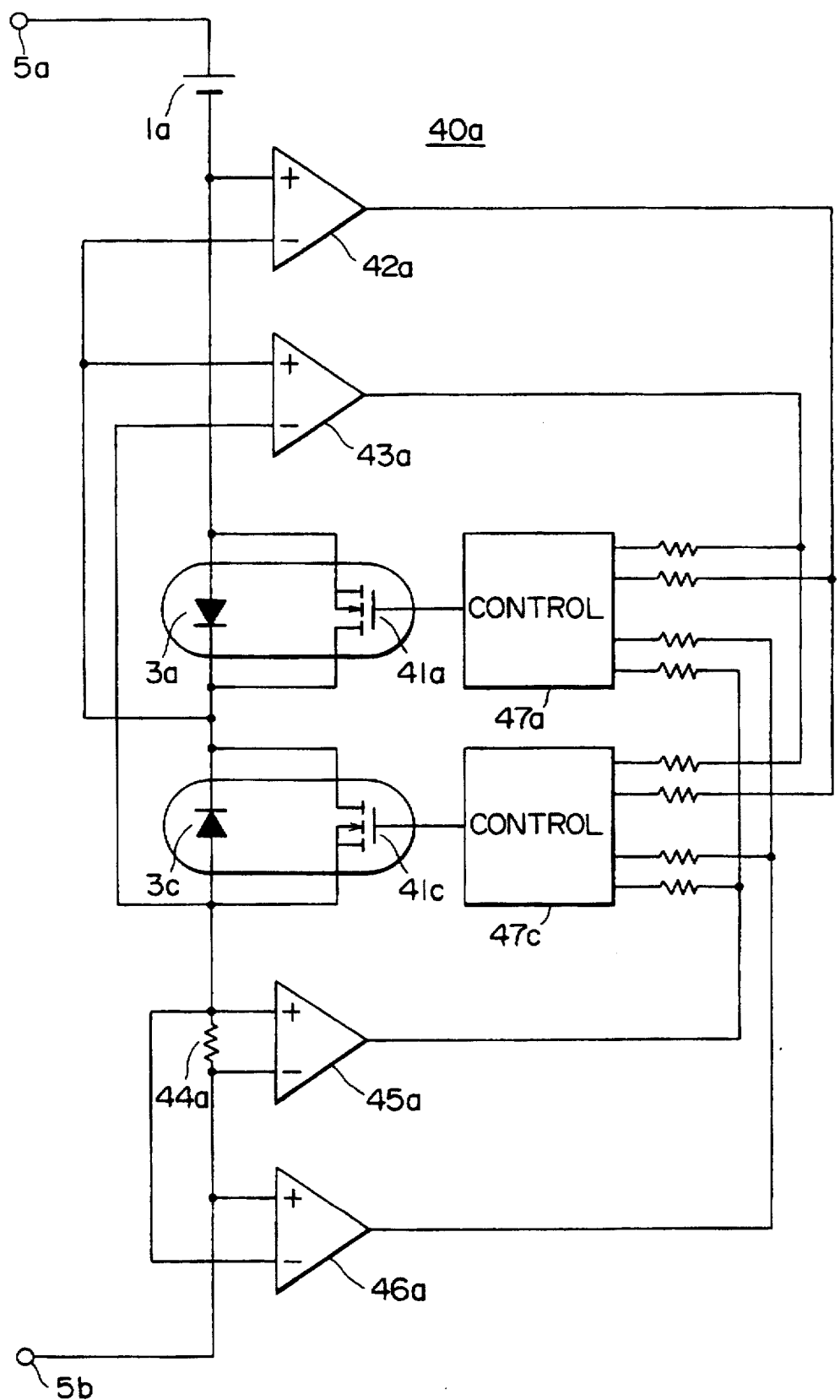
FIG. 14 is a circuit diagram showing a detailed construction of part of the rechargeable battery apparatus shown in FIG. 13.

Referring now to FIGS. 13 and 14, there is shown a rechargeable battery apparatus according to a sixth preferred embodiment of the present invention. The rechargeable battery apparatus of the sixth embodiment involves both of charging and discharging. A general construction of the rechargeable battery apparatus is shown in FIG. 13 while a detailed construction of part of the rechargeable battery apparatus is shown in FIG. 14. It is to be noted that, in FIGS. 13 and 14, like elements to those of the related art parallel charging and discharging apparatus of FIGS. 21A and 21B are denoted by like reference symbols.

Referring first to FIG. 13, the positive electrodes of two secondary batteries 1a and 1b are connected directly to a charging/discharging terminal 5a while diodes 3a, 3c and 3b, 3d and resistors 44a and 44b of charge/discharge control circuits 40a and 40b, respectively are interposed in series between the negative electrodes of the secondary batteries 1a and 1b, respectively, and another charging/discharging terminal 5b. The diodes 3a, 3c and 3b, 3d are connected in the opposite directions to each other.

The charge/discharge control circuits 40a and 40b in the rechargeable battery apparatus of the embodiment of FIG. 13 correspond to the secondary batteries 1a and 1b and have a same construction including the pairs of diodes 3a, 3c and 3b, 3d, respectively.

The charge/discharge control circuit 40a is formed from the pair of diodes 3a and 3c, electronic switches 41a and 41c, voltage detection circuits 42a and 43a, a resistor 44a, a charge detection circuit 45a, a discharge detection circuit 46a, and a control circuit 47a.

Also the charge/discharge control circuit 40b is formed quite similarly from the pair of diodes 3b and 3d, electronic switches 41b and 41d, voltage detection circuits 42b and 43b, a resistor 44b, a charge detection circuit 45b, a discharge detection circuit 46b, and a control circuit 47b.

In the rechargeable battery apparatus of the embodiment of FIG. 13, the cathodes of the diodes 3a and 3c are connected to each other, and the electronic switches 31a and 31c are connected in parallel to the diodes 3a and 3c, respectively, similarly as in the rechargeable battery apparatus of the embodiment of FIG. 11 described hereinabove. Further, in the rechargeable battery apparatus of the present embodiment, voltages between the anodes and the cathodes of the diodes 3a and 3c are supplied to the voltage detection circuits 42a and 43a, respectively.

The resistor 44a is interposed between the charging/discharging terminal 5b and the anode of the diode 3c, and a voltage between the opposite terminals of the resistor 44a is supplied to commonly to the charge detection circuit 45a and the discharge detection circuit 46a.

Further, detection outputs of the charge and discharge detection circuits 45a and 46a and detection outputs of the voltage detection circuits 42a and 43a are supplied to the control circuit 47a, and outputs of the control circuit 47a are supplied as control signals to the electronic switches 41a and 41c.

The charge/discharge control circuit 40a described above is particularly constructed in such a manner as shown in FIG. 14.

Referring to FIG. 14, for example, two n-channel field effect transistors are used for the electronic switches 41a and 41c. Further, pairs of the electronic switches 41a and 41c and the diodes 3a and 3c, respectively, for prevention of back current can be accommodated in the same packages.

The source and the drain of the electronic switch 41a are connected to the anode and the cathode of the diode 3a, respectively, and the source and the drain of the other electronic switch 41c are connected to the anode and the cathode of the diode 3c, respectively. Further, outputs of the control circuits 47a and 47c shown separately from each other are supplied to the gates of the electronic switches 41a and 41c, respectively.

Operation of the rechargeable battery apparatus of the embodiment of FIG. 13 when the secondary batteries 1a and 1b are connected in parallel to each other will be described below.

Referring to FIG. 13, it is assumed that, in an initial state, the terminal voltages E1a and E1b of the secondary batteries 1a and 1b satisfy the relationship given by $$E1a > E1b$$

similarly as described hereinabove.

Further, it is assumed that all of the electronic switches 41a, 41d are in an on state.

In the rechargeable battery apparatus of the present embodiment, when parallel charging or parallel discharging is performed in the conditions described above, in order to cope also with a case wherein the charge current or the discharge current exceeds a reference value, control for protection against an excessive current is performed in the following manner.

In this instance, where the detection values of an overcharge current Io1 and an overdischarge current Io2 from the secondary batteries 1a and 1b are set so as to satisfy the following relationship:

$$Io1 < Io2$$

overcurrent protection upon charging generally proceeds in the following manner.

a. The secondary batteries 1a and 1b are connected in parallel to each other.

b. A charge current to the secondary battery 1b is detected by means of the charge detection circuit 45b.

c. When the current is equal to or lower than a reference value, the charging is continued.

d. But when the current is higher than the reference value, the electronic switch 41d is switched off. The charge current is interrupted by the diode 3d of the path whose set value for an overcurrent is higher.

e. The electronic switch 41d is switched on and the electronic switches 41a and 41b are switched off. At this point, the electronic switch 41c is in an on state.

Consequently, charging paths of high equivalent resistances with the diodes 3a and 3b interposed therein are formed for the secondary batteries 1a and 1b, respectively, so that the charge current can be suppressed to be equal to or lower than the reference value.

In the meantime, a greater amount of charge current flows into the secondary battery 1b whose voltage is lower than the voltage of the secondary battery 1a, and as the charging proceeds, the terminal voltage E1b of the secondary battery 1b rises in proportion to the greater amount of charge current.

Then, the terminal voltage E3b of the diode 3b drops.

f. A terminal voltage of the diode 3b is detected.

g. When the terminal voltage is higher than a predetermined value of, for example, 1.0 V, the off states of the electronic switches 41a and 41b are maintained.

h. If the terminal voltage becomes equal to or lower than the predetermined value, the electronic switch 41b is switched back to an on state.

The electronic switch 41a is kept in an off state, and the charging of the secondary batteries 1a and 1b is continued.

i. A terminal voltage of the diode 3a is detected.

j. When the terminal voltage is equal to or lower than a predetermined value of, for example, 1.0 V, the electronic switch 41a is switched back to an on state.

Thereafter, the equivalent resistances of the charging paths of the secondary batteries 1a and 1b become substantially equal to 0, and the secondary batteries 1a and 1b are individually charged up by 100%.

Further, when parallel discharging of the secondary batteries 1a and 1b is performed in the conditions described above, overcurrent protection generally proceeds in the following manner.

a. The secondary batteries 1a and 1b are connected in parallel to each other.

b. A discharge current from the secondary battery 1b is detected by means of the discharge detection circuit 46b.

c. When the current is equal to or lower than a reference value, the discharging is continued.

d. But when the current is higher than the reference value, the electronic switches 41c and 41d are switched off. In this instance, the electronic switches 41a and 41b are kept in an on state.

Consequently, discharging paths of high equivalent resistances with the diodes 3c and 3d interposed therein are formed for the secondary batteries 1a and 1b, respectively, and the charge current can be suppressed equal to or lower than the reference value.

In the meantime, a greater amount of charge current flows out from the secondary battery 1a whose voltage is higher than the voltage of the secondary battery 1b, and as the charging proceeds, the terminal voltage E1a of the secondary battery 1a drops in proportion to the greater amount of charge current.

Then, the terminal voltage E3c of the diode 3c drops.

e. The terminal voltage of the diode 3c is detected.

f. When the terminal voltage is higher than a predetermined value of, for example, 1.0 V, the off states of the electronic switches 41c and 41d are maintained.

g. If the terminal voltage becomes equal to or lower than the predetermined value, then the electronic switch 41d is switched back to an on state.

The electronic switch 41d is kept in an off state, and the charging or discharging of the secondary batteries 1a and 1b is continued.

h. A terminal voltage of the diode 3d is detected.

i. When the terminal voltage is equal to or lower than a predetermined value of, for example, 1.0 V, the electronic switch 41d is switched back to an on state.

Thereafter, the equivalent resistances of the charging paths of the secondary batteries 1a and 1b become substantially equal to 0, and the secondary batteries 1a and 1b individually discharge by 100%.

It is to be noted that, when the discharge current exceeds the reference voltage in step b, the steps d to f may be skipped to advance the process directly to step g.

On the other hand, where the detection values of the overcharge current Io1 and the overdischarge current Io2 from the secondary batteries 1a and 1b are set to a relationship given below:

Io1>Io2 the overcurrent protection process can be similarly performed by exchanging the paths described above with regard to the set value for an overcurrent in each path.

As described above, in the rechargeable battery apparatus of the embodiment of FIG. 13, since at least one of the diodes for prevention of back current of two secondary batteries is used for suppression of an excessive current in an initial stage of a parallel charging period or a parallel discharging period of the secondary batteries and then electronic switches connected in parallel to the individual diodes are switched on in a middle or following stage of the parallel charging period or the parallel discharging period, the loss which is produced in the diodes for prevention of back current can be reduced.

Seventh Embodiment

Figure 15:
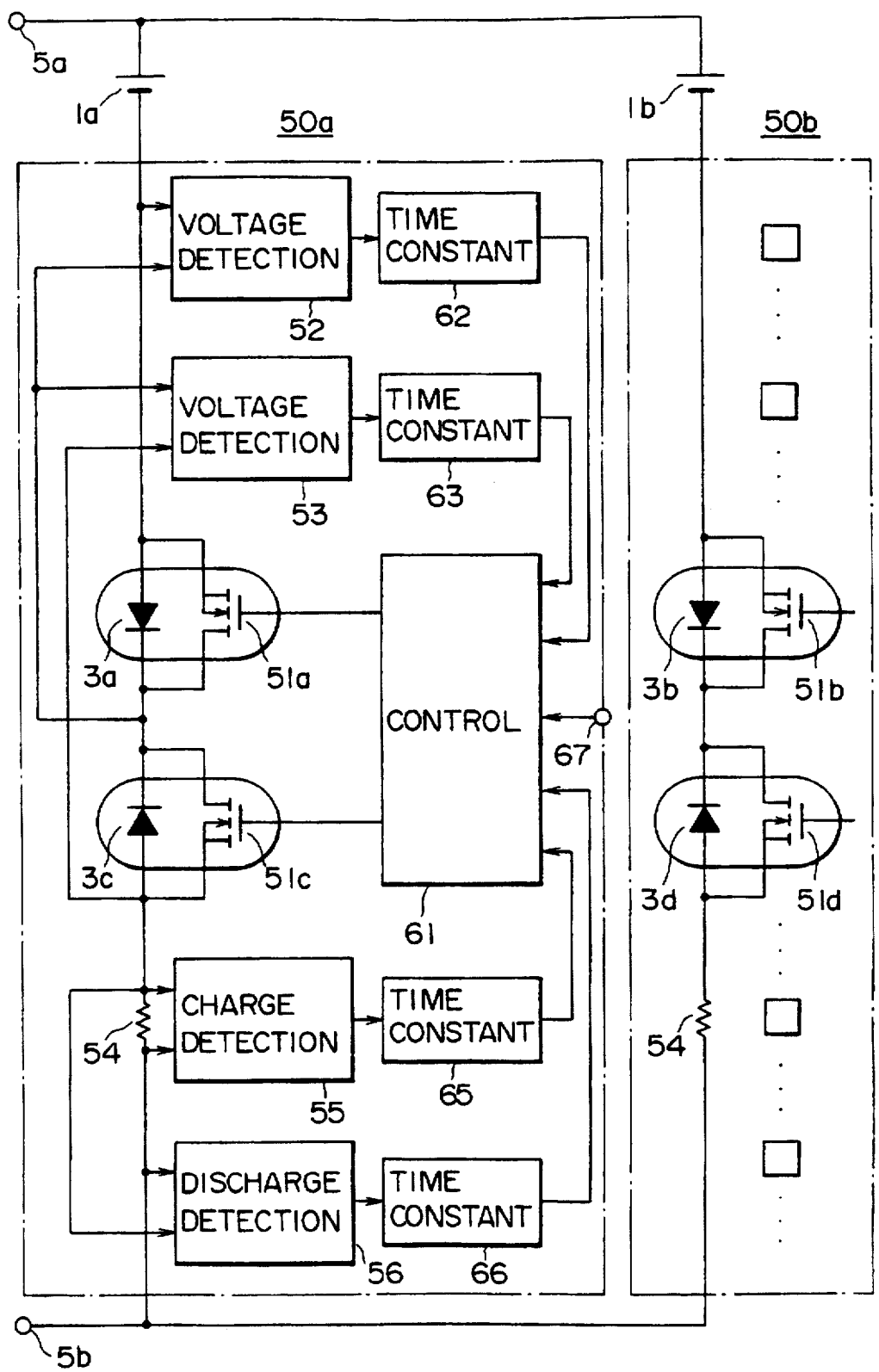
FIG. 15 is a block diagram showing a construction in principle of a rechargeable battery apparatus according to a seventh preferred embodiment of the present invention.

Referring now to FIG. 15, there is shown a rechargeable battery apparatus according to a seventh preferred embodiment of the present invention. The rechargeable battery apparatus of the seventh embodiment involves both charging and discharging. A construction of the rechargeable battery apparatus is shown in FIG. 15, and in like elements to those of the related art parallel charging and discharging apparatus of FIGS. 21A and 21B are denoted by like reference symbols.

Referring to FIG. 15, the positive electrodes of two secondary batteries 1a and 1b are connected directly to a charging/discharging terminal 5a while diodes 3a, 3c and 3b, 3d of charge/discharge control circuits 50a and 50b and resistors 54 for current detection are interposed in series between the negative electrodes of the secondary batteries 1a and 1b and another charging/discharging terminal 5b, respectively. The diodes 3a, 3c and 3b, 3d are connected in the opposite directions to each other.

The charge/discharge control circuits 50a and 50b in the rechargeable battery apparatus of the embodiment of FIG. 15 correspond to the secondary batteries 1a and 1b and have a same construction including the pairs of diodes 3a, 3c and 3b, 3d, respectively.

The charge/discharge control circuit 50a is formed from the pair of diodes 3a and 3c, field effect transistors 51a and 51c as electronic switches, voltage detection circuits 52 and 53, a resistor 54, a charge detection circuit 55, a discharge detection circuit 56, a control circuit 61, and time constant circuits 62, 63, 65 66 interposed between the control circuit 61 and the detection circuits 52, 53, 55, 56, respectively.

It is to be noted that, in FIG. 15, the other charge/discharge control circuit 50b is shown, for simplified illustration, formed from the diodes 3b and 3d, field effect transistors 51b and 51d, and a resistor 54.

In the rechargeable battery apparatus of the embodiment of FIG. 15, the cathodes of the diodes 3a and 3c are connected to each other, and the sources and the drains of the field effect transistors 51a and 51c as electronic switches are connected in parallel to the anodes and the cathodes of the diodes 3a and 3c, respectively, similarly as in the rechargeable battery apparatus of the embodiment of FIG. 13. Further, voltages between the anodes and the cathodes of the diodes 3a and 3c are supplied to the voltage detection circuits 52 and 53, respectively.

The resistor 54 is interposed between the charging/discharging terminal 5b and the anode of the diode 3c, and a voltage between the opposite terminals of the resistor 54 is supplied to the charge detection circuit 55 and the discharge detection circuit 56.

Further, detection outputs of the charge and discharge detection circuits 55 and 56 and detection outputs of the voltage detection circuits 52 and 53 are supplied to the control circuit 61 via the time constant circuits 65, 66, 62, 63, respectively, and a control signal from the outside is supplied to the control circuit 61 through an input terminal 67. Outputs of the control circuit 61 are supplied as control signals to the gates of the field effect transistors 51a and 51c.

It is to be noted that the time constants of the time constant circuits 62, 63, 65, 66 may have suitably different values.

Or, hysteresis circuits may be provided in place of the time constant circuits 62, 63, 65, 66.

Operation of the rechargeable battery apparatus of the embodiment of FIG. 15 when the secondary batteries 1a and 1b are connected in parallel to each other will be described below.

Referring to FIG. 15, if it is assumed that, in an initial state, the terminal voltages E1a and E1b of the secondary batteries 1a and 1b satisfy the relationship given by E1a>E1b then a charge control operation of the rechargeable battery apparatus of the embodiment of FIG. 15 generally proceeds in the following manner.

a. The field effect transistors 51a, 51b, 51c, 51d are all switched off.

b. The field effect transistors 51a, 51b, 51c, 51d are all switched on in response to a charging command from the input terminal 67.

c. The charge or discharge currents of the secondary batteries 1a and 1b are detected by means of the charge and discharge detection circuits 55 and 56, respectively.

d. If some charge current is detected, the charging of the secondary batteries 1a and 1b is continued.

e. If some discharge current is detected, the field effect transistor 51a is switched off to interrupt the discharging path of the secondary battery 1a.

f. A terminal voltage of the diode 3a is detected.

g. If the terminal voltage is higher than a predetermined value of, for example, 1.0 V, the off state of the field effect transistor 51a is continued.

h. But if the terminal voltage becomes equal to or lower than the predetermined value, the field effect transistor 51a is switched back to an on state to charge the secondary batteries 1a and 1b.

On the other hand, in the conditions described above, a discharge control operation of the rechargeable battery apparatus of the embodiment of FIG. 15 generally proceeds in the following manner.

a. The field effect transistors 51a, 51b, 51c, 51d are all switched off.

b. The field effect transistors 51a, 51b, 51c, 51d are all switched on in response to a discharging command from the input terminal 67.

c. The charge or discharge currents of the secondary batteries 1a and 1b are detected by means of the charge and discharge detection circuits 55 and 56, respectively.

d. If some discharge current is detected, then the discharging of the secondary batteries 1a and 1b is continued.

e. If some charge current is detected, then the field effect transistor 51d is switched off to interrupt the charging path of the secondary battery 1b.

f. A terminal voltage of the diode 3d is detected.

g. If the terminal voltage is higher than a predetermined value of, for example, 1.0 V, the off state of the field effect transistor 51d is continued.

h. But if the terminal voltage becomes equal to or lower than the predetermined value, the field effect transistor 51d is switched back to an on state to discharge the secondary batteries 1a and 1b.

As described above, in the rechargeable battery apparatus of the embodiment of FIG. 15, as an electronic switch connected in parallel to a diode for prevention of back current of at least one of two secondary batteries is switched on within a parallel charging period or a parallel discharging period of the secondary batteries, the loss which is produced in the diode for prevention of back current can be reduced.

Alternatively, in the conditions described above, a parallel discharge control operation of the rechargeable battery apparatus of the embodiment of FIG. 15 may proceed in the following manner.

a. The field effect transistors 51a, 51b, 51c, 51d are all switched off.

b. The field effect transistors 51c and 51d on the lower side in FIG. 15 are switched on while keeping the field effect transistors 51a and 51b on the upper side in FIG. 15 in an off state in response to a charging command from the input terminal 67.

Consequently, charging paths having high equivalent resistances with the diodes 3a and 3b interposed therein are formed for the secondary batteries 1a and 1b, respectively.

Further, a greater amount of charge current flows into the secondary battery 1b which has a lower voltage than the voltage of the secondary battery 1a, and as the charging proceeds, the terminal voltage E1b of the secondary battery 1b rises in proportion to the greater amount of charge current.

Then, the terminal voltage E3b of the diode 3b drops.

c. A terminal voltage of the diode 3b is detected.

d. While the terminal voltage has a value higher than a predetermined value of, for example, 1.0 V, the terminal voltage detection in step c is continued while keeping the state in step b.

e. If the terminal voltage becomes equal to or lower than the predetermined value, then the field effect transistors 51a and 51b are switched back to an on state.

Thereafter, the equivalent resistances of the charging paths of the secondary batteries 1a and 1b become substantially equal to 0, and the secondary batteries 1a and 1b are individually charged up by 100%.

Or, in the conditions described above, a parallel discharge control operation of the rechargeable battery apparatus of the embodiment of FIG. 15 may proceed in the following manner.

a. The field effect transistors 51a 51b, 51c, 51d are all switched off.

b. The field effect transistors 51a and 51b on the upper side in FIG. 15 are switched on while keeping the field effect transistors 51c and 51d on the lower side in FIG. 15 in an off state in response to a discharging command from the input terminal 67.

Consequently, charging paths having high equivalent resistances with the diodes 3c and 3d interposed therein are formed for the secondary batteries 1a and 1b, respectively.

Further, a greater amount of discharge current flows out from the secondary battery 1a which has a higher voltage than the voltage of the secondary battery 1b, and as the discharging proceeds, the terminal voltage E1a of the secondary battery 1a drops in proportion to the greater amount discharge current.

Then, the terminal voltage E3c of the diode 3c drops.

c. A terminal voltage of the diode 3c is detected.

d. While the terminal voltage has a value higher than a predetermined value of, for example, 1.0 V, the terminal voltage detection in step c is continued while keeping the state in step b.

e. If the terminal voltage becomes equal to or lower than the predetermined value, then the field effect transistors 51c and 51d are switched back to an on state.

Thereafter, the equivalent resistances of the charging paths of the secondary batteries 1a and 1b become substantially equal to 0, and the secondary batteries 1a and 1b are individually discharged by 100%.

Additionally, in the conditions described above, a parallel discharge control operation of the rechargeable battery apparatus of the embodiment of FIG. 15 may also proceed in the following manner.

a. The secondary batteries 1a and 1b are connected in parallel to each other.

b. The field effect transistor 51a, 51b, 51c 51d are all switched off.

c. It is detected whether a command from the input terminal 67 indicates charge or discharge.

d. When the command indicates charge, the field effect transistors 51c and 51d on the lower side in FIG. 15 are switched on while keeping the field effect transistors 51a and 51b on the upper side in FIG. 15 in an off state.

Consequently, charging paths having high equivalent resistances with the diodes 3a and 3b interposed therein are formed for the secondary batteries 1a and 1b, respectively.

Further, a greater amount of charge current flows into the secondary battery 1b which has a lower voltage than the voltage of the secondary battery 1a, and as the charging proceeds, the terminal voltage E1b of the secondary battery 1b rises in proportion to the greater amount of charge current.

Then, the terminal voltage E3b of the diode 3b drops.

e. A terminal voltage of the diode 3b is detected.

f. While the terminal voltage has a value higher than a predetermined value of, for example, 1.0 V, the terminal voltage detection in step e is continued while keeping the state in step d.

g. If the terminal voltage becomes equal to or lower than the predetermined value, then the field effect transistors 51a and 51b are switched back to an on state.

Consequently, the equivalent resistances of the charging paths of the secondary batteries 1a and 1b are reduced.

h. It is determined by the charge detection circuit 55 that the charge current is substantially equal to 0.

i. The field effect transistors 51c and 51d are switched back to an off state.

The charging is thereby completed.

j. When the result of the detection in step c is discharge, the field effect transistors 51a and 51b on the upper side in FIG. 15 are switched on while keeping the field effect transistors 51c and 51d on the lower side in FIG. 15 in an off state.

Consequently, charging paths having high equivalent resistances with the diodes 3c and 3d interposed therein are formed for the secondary batteries 1a and 1b, respectively.

Further, a greater amount of charge current flows out from the secondary battery 1a which has a higher voltage than the voltage of the secondary battery 1b, and as the charging proceeds, the terminal voltage E1a of the secondary battery 1a drops in proportion to the greater amount of charge current.

Then, the terminal voltage E3c of the diode 3c drops.

k. A terminal voltage of the diode 3c is detected.

l. While the terminal voltage has a value higher than a predetermined value of, for example, 1.0 V, the terminal voltage detection in step k is continued while keeping the state in step j.

m. If the terminal voltage becomes equal to or lower than the predetermined value, then the field effect transistors 51a and 51b are switched back to an on state. Consequently, the equivalent resistances of the discharging paths of the secondary batteries 1a and 1b are reduced.

n. It is determined by the discharge detection circuit 56 that the discharge current is substantially equal to 0.

o. The field effect transistors 51a and 51b are switched back to an off state.

The discharging is thereby completed.

As described above, in the rechargeable battery apparatus of the embodiment of FIG. 15, as an electronic switch connected in parallel to a diode for prevention of back current of at least one of two secondary batteries is switched on within a parallel charging period or a parallel discharging period of the secondary batteries, the loss which is produced in the diode for prevention of back current can be reduced.

Eighth Embodiment

Figure 16:
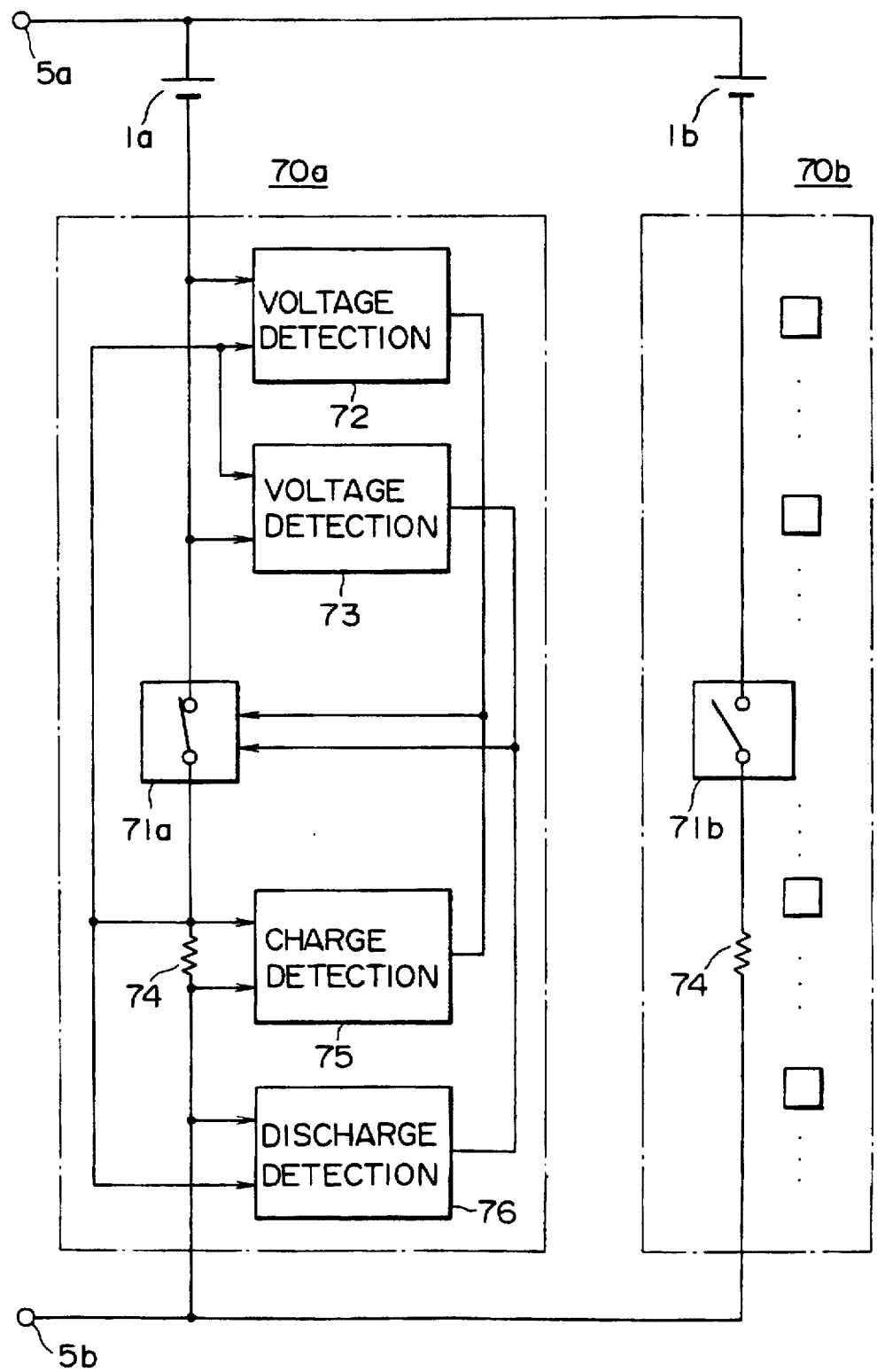
FIG. 16 is a block diagram showing a construction in principle of a rechargeable battery apparatus according to an eighth preferred embodiment of the present invention.
Figure 17:
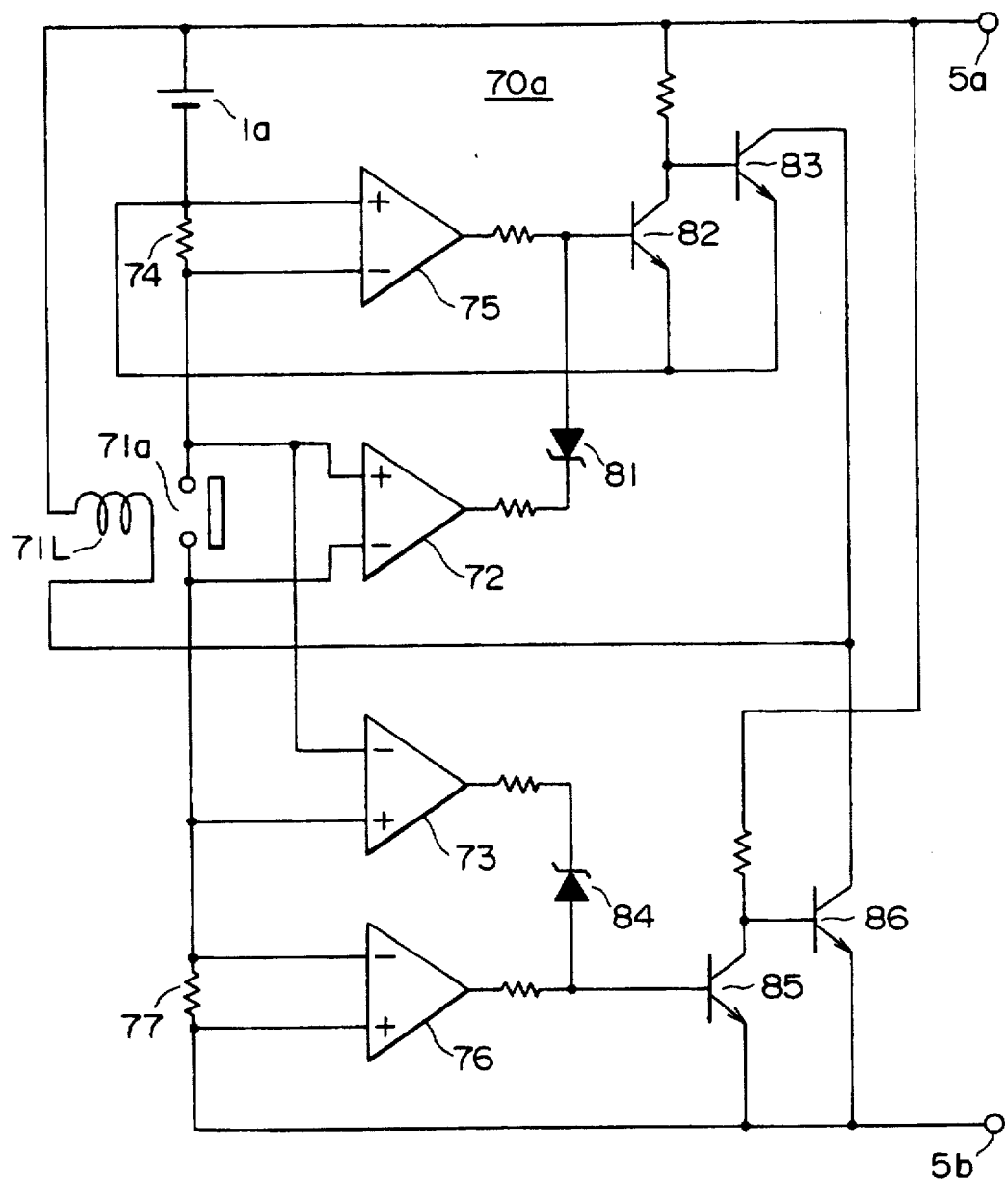
FIG. 17 is a circuit diagram showing a detailed construction of part of the rechargeable battery apparatus shown in FIG. 16.
Figure 18:
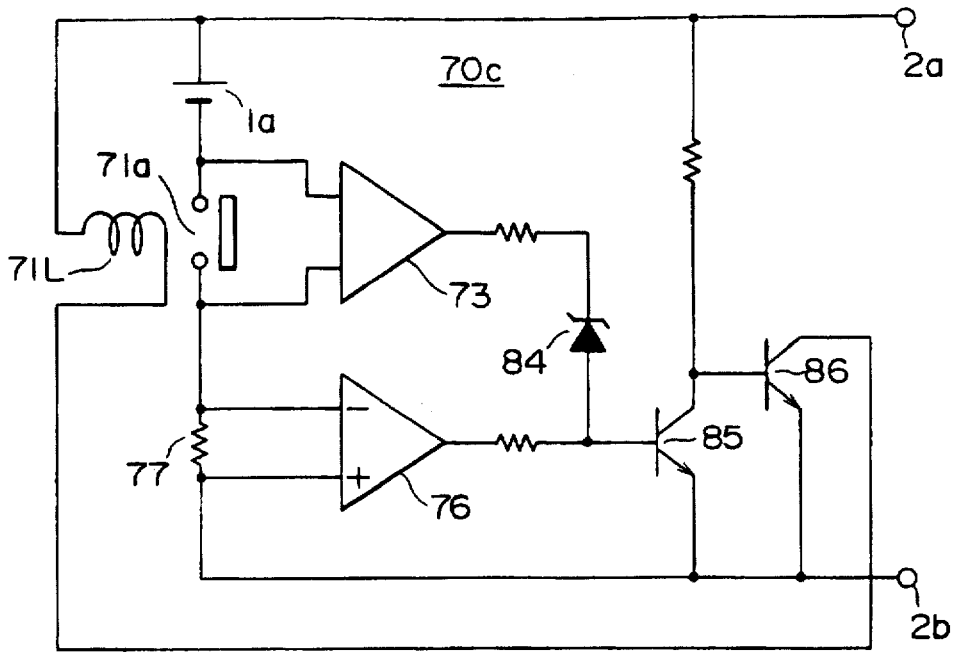
FIG. 18 is a circuit diagram showing another detailed construction of part of the rechargeable battery apparatus shown in FIG. 16.
Figure 19:
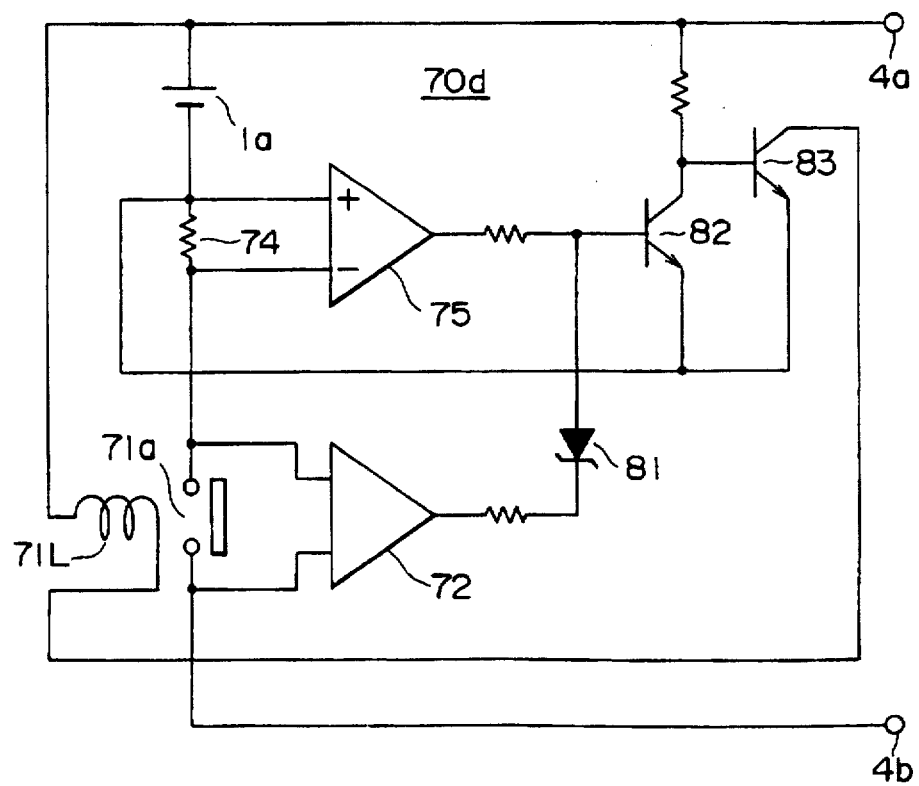
FIG. 19 is a circuit diagram showing a further detailed construction of part of the rechargeable battery apparatus shown in FIG. 16.

Referring now to FIGS. 16 to 19, there is shown a rechargeable battery apparatus according to an eighth preferred embodiment of the present invention. A general construction of the rechargeable battery apparatus is shown in FIG. 16 while a detailed construction of part of the rechargeable battery apparatus is shown in FIGS. 17 to 19. It is to be noted that, in FIGS. 16 to 19, like elements to those of the related art parallel charging and discharging apparatus of FIGS. 21A and 21B are denoted by like reference symbols.

Referring first to FIG. 16, the positive electrodes of two secondary batteries 1a and 1b are connected directly to a charging/discharging terminal 5a while switch elements 71a and 71b of charge/discharge control circuits 70a and 70b and resistors 74 for current detection are interposed in series between the negative electrodes of the secondary batteries 1a and 1b and another charging/discharging terminal 5b, respectively.

The charge/discharge control circuits 70a and 70b in the rechargeable battery apparatus of the embodiment of FIG. 16 correspond to the secondary batteries 1a and 1b and have a same construction including the switch elements 71a and 71b, respectively.

In the charge/discharge control circuit 70a, a pair of voltage detection circuits 72 and 73 are connected in parallel to the switch element 71a such that they have opposite polarities to each other, and a charge detection circuit 75 and a discharge detection circuit 76 are connected in parallel to the resistor 74.

Detection outputs of the voltage detection circuit 72 and the charge detection circuit 75 are supplied as discharge control signals to the switch element 71a, and detection outputs of the voltage detection circuit 73 and the discharge detection circuit 76 are supplied as charge control signals to the switch element 71a.

It is to be noted that, in FIG. 16, the other charge/discharge control circuit 70b is shown including only the switch element 71b and the resistor 74 for simplified illustration.

The charge/discharge control circuit 70a having such a construction as described above is particularly constructed in such a manner as shown in FIG. 17, and a relay 71a is used as a switch element.

In the charge/discharge control circuit 70a shown in FIG. 17, the voltage detection circuit 72 is connected in parallel to the relay 71a, and the charge detection circuit 75 is connected in parallel to the resistor 74 for current detection interposed between the negative electrode of the secondary battery 1a and the relay 71a. Further, the other voltage detection circuit 73 is connected in parallel to the relay 71a such that it has a polarity opposite to that of the voltage detection circuit 72, and the discharge detection circuit 76 is connected in parallel to a resistor 77 for current detection interposed between the relay 71a and the charging/discharging terminal 5b.

The output of the voltage detection circuit 72 is supplied to the base of an npn transistor 82 of an emitter grounding connection through a Zener diode 81, and the output of the charge detection circuit 75 is supplied directly to the base of the transistor 82.

The base of another npn transistor 83 of an emitter grounding is connected in cascade connection to the collector of the transistor 82, and the collector of the transistor 83 is connected to the charging/discharging terminal 5a through an excitation coil 71L of the relay 71a. Further, the emitters of the transistors 82 and 83 are connected to the negative electrode of the secondary battery 1a.

Similarly, the output of the other voltage detection circuit 73 is supplied to the base of an npn transistor 85 of an emitter grounding connection through a Zener diode 84, and the output of the discharge detection circuit 76 is supplied directly to the base of the transistor 85.

The base of another npn transistor 86 of an emitter grounding connection is connected in cascade to the collector of the transistor 85, and the collector of the transistor 86 is connected to the charging/discharging terminal 5a through the excitation coil 71L of the relay 71a. Further, the emitters of the transistors 85 and 86 are connected to the other charging/discharging terminal 5b.

It is to be noted that, while the two resistors 74 and 77 are provided for the charge/discharge control circuit 70a in FIG. 17 in order to detect a charge current and a discharge current, alternatively the charge and discharge detection circuits 75 and 76 may be connected commonly to the single resistor 74 as seen in FIG. 16.

Where such a charge/discharge control circuit 70a as described above is used exclusively for charge control or discharge control, it may be constructed like a charge control circuit 70c shown in FIG. 18 or like a discharge control circuit 70d shown in FIG. 19.

It is to be noted, in FIGS. 18 and 19, elements corresponding to those of FIG. 17 are denoted by same reference symbols and overlapping descriptions thereof are omitted.

Subsequently, operation of the rechargeable battery apparatus of the embodiment of FIG. 16 when the secondary batteries 1a and 1b are connected in parallel to each other will be described below.

Referring to FIG. 16, it is assumed that, in an initial state, the terminal voltages E1a and E1b of the secondary batteries 1a and 1b satisfy the relationship given by $$E1a > E1b$$

similarly as described hereinabove.

Further, it is assumed that both of the switch elements 71a and 71b are in a normally closed state.

In the conditions described above, parallel charge control of the rechargeable battery apparatus of the embodiment of FIG. 16 generally proceeds in the following manner.

a. A discharge current is detected by means of the discharge detection circuit 76.

b. If some discharge current from the secondary battery 1a is detected, then the switch element 71a is switched off in response to a detection output of the discharge detection circuit 76.

Consequently, the discharging path of the secondary battery 1a is interrupted while only the secondary battery 1b is charged.

c. During the charging period, a voltage between the contacts of the switch element 71a is detected.

d. While a voltage is detected between the contacts of the switch element 71a, the off state of the switch element 71a is maintained.

e. If the charging of the secondary battery 1b proceeds until a voltage is not detected between the contacts of the switch element 71a, the switch element 71a is switched back to an on state.

f. Thereafter, both of the secondary batteries 1a and 1b are charged.

On the other hand, in the conditions described above, parallel discharging control of the rechargeable battery apparatus of the embodiment of FIG. 16 generally proceeds in the following manner.

a. A charge current is detected by means of the charge detection circuit 75.

b. If some charge current to the secondary battery 1b is detected, then the switch element 71b is switched off in response to a detection output of the charge detection circuit 75.

Consequently, the charging path of the secondary battery 1b is interrupted while only the secondary battery 1a discharges.

c. During the discharging period, a voltage between the contacts of the switch element 71b is detected.

d. While a voltage is detected between the contacts of the switch element 71b, the off state of the switch element 71b is maintained.

e. If the discharging of the secondary battery 1a proceeds until a voltage is not detected between the contacts of the switch element 71b, the switch element 71b is switched back to an on state.

f. Thereafter, both of the secondary batteries 1a and 1b discharge.

As described above, in the rechargeable battery apparatus of the embodiment of FIG. 16, by switching off one of switch elements during a parallel charging period or a parallel discharging period of secondary batteries, a reverse current of any of the secondary batteries can be prevented without using a diode for prevention of back current, and the loss which arises from a diode for prevention of back current can be reduced.

Ninth Embodiment

Figure 20:
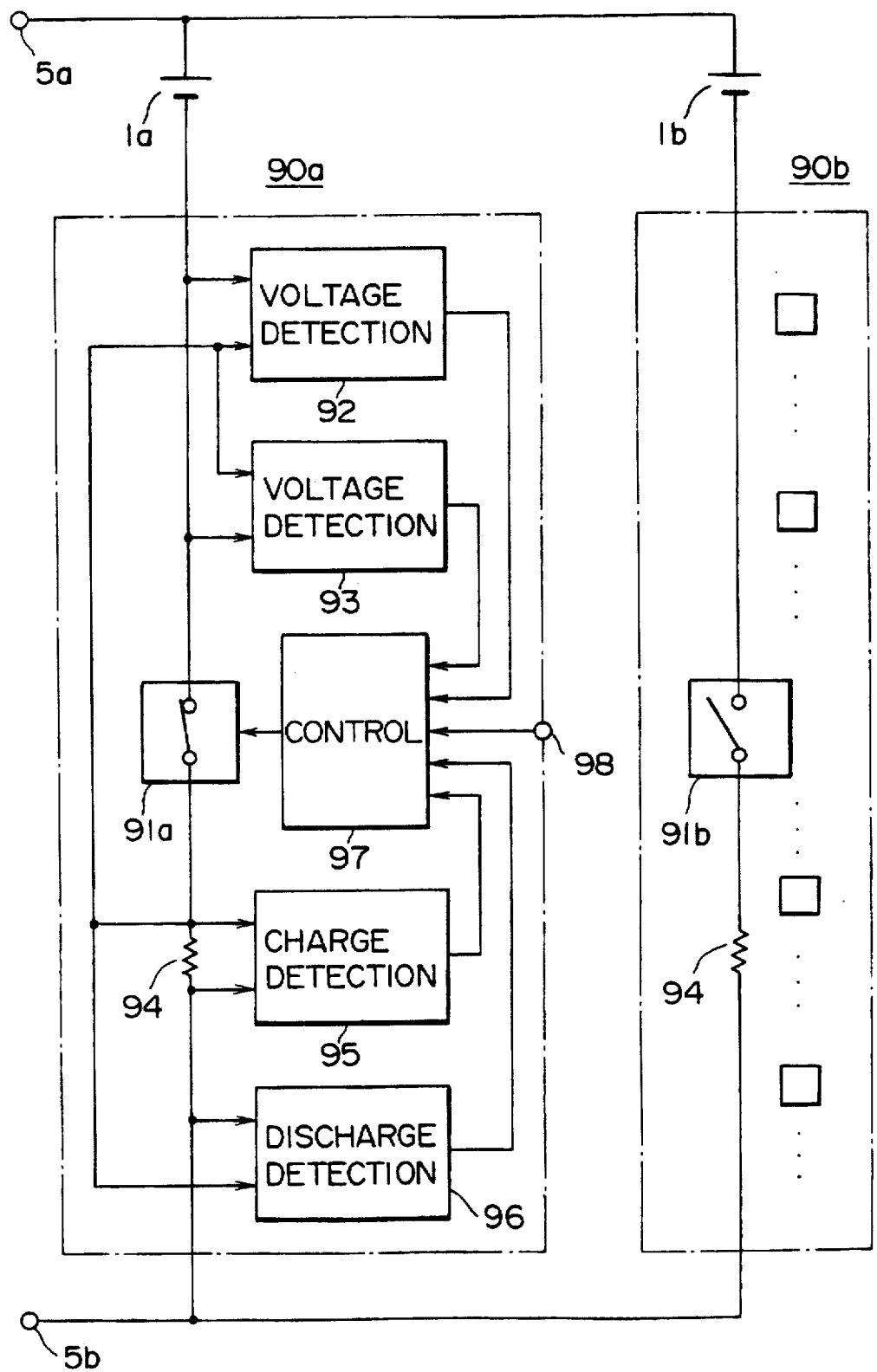
FIG. 20 is a block diagram showing a construction in principle of a rechargeable battery apparatus according to a ninth preferred embodiment of the present invention.

Referring now to FIG. 20, there is shown a rechargeable battery apparatus according to a ninth preferred embodiment of the present invention. A general construction of the rechargeable battery apparatus is shown in FIG. 20, and like elements to those of the related art parallel charging and discharging apparatus of FIGS. 21A and 21B are denoted by like reference symbols.

Referring to FIG. 20, the positive electrodes of two secondary batteries 1a and 1b are connected directly to a charging/discharging terminal 5a while switch elements 91a and 91b of charge/discharge control circuit 90a and 90b and resistors 94 for current detection are interposed in series between the negative electrodes of the secondary batteries 1a and 1b and another charging/discharging terminal 5b, respectively.

The charge/discharge control circuits 90a and 90b in the rechargeable battery apparatus of the embodiment of FIG. 20 correspond to the secondary batteries 1a and 1b and have a same construction including the switch elements 91a and 91b, respectively.

In the charge/discharge control circuit 90a, a pair of voltage detection circuits 92 and 93 are connected in parallel to the switch element 91a such that they have opposite polarities to each other, and a charge detection circuit 95 and a discharge detection circuit 96 are connected in parallel to the resistor 94.

Detection outputs of the charge and discharge detection circuits 95 and 96 and the voltage detection circuits 92 and 93 are supplied to a control circuit 97, and a control signal from the outside is supplied to the control circuit 97 via an input terminal 98. An output of the control circuit 97 is supplied as a control signal to the switch element 91a.

It is to be noted that, in FIG. 20, the other charge/discharge control circuit 90b is shown including only the switch element 91b and the resistor 94 for simplified illustration.

Subsequently, operation of the rechargeable battery apparatus of the embodiment of FIG. 20 when the secondary batteries 1a and 1b are connected in parallel to each other will be described below.

Referring to FIG. 20, it is assumed that, in an initial state, the terminal voltages E1a and E1b of the secondary batteries 1a and 1b satisfy the relationship given by $$E1a > E1b$$

similarly as described hereinabove.

Further, it is assumed that both of the switch elements 91a and 91b are in a normally open state opposite the normally closed state of the switch elements 71a, 71b of the rechargeable battery apparatus of the embodiment of FIG. 16.

In the conditions described above, parallel charge control of the rechargeable battery apparatus of the embodiment of FIG. 20 generally proceeds in the following manner.

a. The switch elements 91a and 91b are switched on in response to a charging command from the input terminal 98.

b. A discharge current is detected by means of the discharge detection circuit 96.

c. If some discharge current from the secondary battery 1a is detected, then the switch element 91a is switched off in response to a detection output of the discharge detection circuit 96.

Consequently, the discharging path of the secondary battery 1a is interrupted while only the secondary battery 1b is charged.

d. During the charging period, a voltage between the contacts of the switch element 91a is detected.

e. While a voltage is detected between the contacts of the switch element 91a, the off state of the switch element 91a is maintained.

f. If the charging of the secondary battery 1b proceeds until a voltage is not detected between the contacts of the switch element 91a, then the switch element 91a is switched back to an on state.

g. Thereafter, both of the secondary batteries 1a and 1b are charged.

On the other hand, in the conditions described above, parallel discharge control of the rechargeable battery apparatus of the embodiment of FIG. 20 generally proceeds in the following manner.

a. The switch elements 91a and 91b are switched on in response to a charging command from the input terminal 98.

b. A charge current is detected by means of the charge detection circuit 95.

c. If some charge current to the secondary battery 1b is detected, then the switch element 91b is switched off in response to a detection output of the charge detection circuit 95.

Consequently, the charging path to the secondary battery 1b is interrupted while only the secondary battery 1a discharges.

d. During the discharging period, a voltage between the contacts of the switch element 91b is detected.

e. While a voltage is detected between the contacts of the switch element 91b, the off state of the switch element 91b is maintained.

f. If the discharging of the secondary battery 1a proceeds until a voltage is not detected between the contacts of the switch element 91b, the switch element 91b is switched back to an on state.

g. Thereafter, both of the secondary batteries 1a and 1b discharge.

As described above, in the rechargeable battery apparatus of the embodiment of FIG. 20, by switching off one of switch elements during a parallel charging period or a parallel discharging period of secondary batteries, a reverse current of any of the secondary batteries can be prevented without using a diode for prevention of back current, and the loss which arises from a diode for prevention of back current can be reduced.

Having now fully described the invention, it will be apparent to one of ordinary skill in the art that many changes and modifications can be made thereto without departing from the spirit and scope of the invention as set forth herein.

What is claimed is:

1. A rechargeable battery apparatus, comprising:
rechargeable battery means for storing and utilizing electric charge;
diode means connected in series to said rechargeable battery means for preventing back current flow through said battery means;
switching means connected in parallel to said diode means for canceling a power loss in said diode means; and
control means for detecting a voltage between opposite terminals of said diode means and for controlling operation of said switching means in accordance with a detected voltage.

2. The rechargeable battery apparatus as claimed in claim 1, wherein said diode means is connected so as to allow flow of current for charging said rechargeable battery means.

3. The rechargeable battery apparatus as claimed in claim 1, wherein said diode means is connected so as to allow flow of current for discharging said rechargeable battery means.

4. The rechargeable battery apparatus as claimed in claim 1, wherein said control means controls operation of said switching means by employing hysteresis characteristics.

5. The rechargeable battery apparatus as claimed in claim 1, wherein said switching means includes a bipolar transistor.

6. The rechargeable battery apparatus as claimed in claim 1, wherein said switching means includes a field effect transistor.

7. The rechargeable battery apparatus as claimed in claim 1, further comprising:
a current detection resistor connected in series with said rechargeable battery means for detecting current to said rechargeable battery means; and
a voltage detector for detecting a voltage between the opposite terminals of said current detection resistor; and wherein operation of said switching means is controlled by said control means in accordance with an output signal of said voltage detector.

8. The rechargeable battery apparatus as claimed in claim 7, wherein said diode means is connected so as to allow flow of current for charging said rechargeable battery means.

9. The rechargeable battery apparatus as claimed in claim 7, wherein said diode means is connected so as to allow flow of current for discharging said rechargeable battery means.

10. A rechargeable battery apparatus, comprising:
rechargeable battery means for storing and utilizing electric charge;
first and second diode means connected in series with said rechargeable battery means and connected in opposite directions to each other for preventing back current flow through said battery means;
first and second switching means connected in parallel with said first and second diode means, respectively, for canceling a power loss in said first and second diode means; and
control means for detecting voltages across terminals of both said first and second diode means and controlling operation of said first and second switching means in accordance with detected voltages.

11. The rechargeable battery apparatus as claimed in claim 10, further comprising:
a current detection resistor connected in series with said rechargeable battery means for detecting current to said rechargeable battery means;
a voltage detector for detecting a voltage between opposite terminals of said current detection resistor; and wherein
operation of said first and second switching means is controlled by said control means in accordance with an output signal of said voltage detector.

12. The rechargeable battery apparatus as claimed in claim 11, wherein said control means includes means for detecting voltages across said first and second diode means as a single voltage between the opposite terminals of said first and second diode means which are connected in series.

13. The rechargeable battery apparatus as claimed in claim 11, wherein said control means includes means for detecting voltages across said first and second diode means as two voltages between the opposite terminals of said first diode means and said second diode means, respectively.

14. A rechargeable battery apparatus as claimed in claim 11, wherein said voltage detector detects the voltage between the opposite terminals of said current detection resistor in both charging and discharging directions.

15. A rechargeable battery apparatus comprising:

rechargeable battery means for storing and utilizing electric charge;

first and second diode means connected in series with said rechargeable battery means and connected in opposite directions to each other for preventing back current flow through said battery means;

first and second switching means connected in parallel with said first and second diode means, respectively, for canceling a power loss in said first and second diode means;

control means for detecting voltages between opposite terminals of said first and second diode means and controlling operation of said first and second switching means in accordance with detected voltages;

a current detection resistor connected in series with said rechargeable battery means for detecting current to said rechargeable battery means;

a voltage detector for detecting a voltage between opposite terminals of said current detection resistor, wherein operation of said first and second switching means is controlled by said control means in accordance with an output signal of said voltage detector; and time constant means, and wherein said control means controls operation of said first and second switching means in accordance with one of said output signals of said voltage detector and an output signal of a detected voltage between the opposite terminals of said first and second diode means received through said time constant circuit means.

16. The rechargeable battery apparatus as claimed in claim 15, wherein said time constant circuit means includes a plurality of time constant circuits having different respective time constants.

17. A rechargeable battery apparatus comprising:

rechargeable battery means for storing and utilizing electric charge;

first and second diode means connected in series with said rechargeable battery means and connected in opposite directions to each other for preventing back current flow through said battery means;

first and second switching means connected in parallel with said first and second diode means, respectively, for canceling a sower loss in said first and second diode means;

control means for detecting voltages between opposite terminals of said first and second diode means and controlling operation of said first and second switching means in accordance with detected voltages;

a current detection resistor connected in series with said rechargeable battery means for detecting current to said rechargeable battery means;

a voltage detector for detecting a voltage between opposite terminals of said current detection resistor, wherein operation of said first and second switching means is controlled by said control means in accordance with an output signal of said voltage detector; and a hysteresis circuits and wherein said control means controls operation of said first and second switching means in accordance with one of said output signals of said voltage detector and an output signal of the detected voltage between the opposite terminals of said first and second diode means received through said hysteresis circuit.

18. A rechargeable battery apparatus comprising:

rechargeable battery means for storing and utilizing electric charge;

first and second diode means connected in series with said rechargeable battery means and connected in opposite directions to each other for preventing back current flow through said battery means;

first and second switching means connected in parallel with said first and second diode means, respectively, for canceling a power loss in said first and second diode means;

control means for detecting voltages between opposite terminals of said first and second diode means and controlling operation of said first and second switching means in accordance with detected voltages;

a current detection resistor connected in series with said rechargeable battery means for detecting current to said rechargeable battery means;

a voltage detector for detecting a voltage between opposite terminals of said current detection resistor, wherein operation of said first and second switching means is controlled by said control means in accordance with an output signal of said voltage detector; and wherein said control means controls operation of said first and second switching means in accordance with a control signal from an external circuit.

19. A rechargeable battery apparatus comprising:

a plurality of parallel-connected rechargeable batteries for storing and utilizing electric charge, one of said batteries having a stored voltage different than another of said batteries; and a plurality of charging control units, each unit connected to a respective one of said batteries and including:
  switching means connected in series with said respective rechargeable battery for controlling a path of current to said respective battery;
  switch detecting means for detecting a voltage at a terminal of said switching means;
  a current detection resistor connected in series with said rechargeable battery for detecting current to said rechargeable battery;
  a voltage detector for detecting a voltage between opposite terminals of said current detection resistor; and
  control means for controlling operation of said switching means in accordance with outputs of said switch detecting means and said voltage detector so that voltages in said plurality of batteries are made more equal.

20. The rechargeable battery apparatus as claimed in claim 19, wherein said switching means includes a relay.

* * * * *